US012533053B2

(12) United States Patent
Yang et al.

(10) Patent No.: US 12,533,053 B2
(45) Date of Patent: Jan. 27, 2026

(54) PHOTOPLETHYSMOGRAPHY BASED NON-INVASIVE BLOOD GLUCOSE PREDICTION BY NEURAL NETWORK

(71) Applicant: Academia Sinica, Taipei (TW)

(72) Inventors: Fu-Liang Yang, Hsinchu (TW); Justin Chu, Taoyuan (TW)

(73) Assignee: Academia Sinica, Taipei (TW)

( * ) Notice: Subject to any disclaimer, the term of this patent is extended or adjusted under 35 U.S.C. 154(b) by 678 days.

(21) Appl. No.: 17/876,579

(22) Filed: Jul. 29, 2022

(65) Prior Publication Data

US 2024/0032825 A1     Feb. 1, 2024

(51) Int. Cl.
*A61B 5/145*     (2006.01)
*A61B 5/00*     (2006.01)
*A61B 5/0205*     (2006.01)
*A61B 5/024*     (2006.01)
*G06N 3/02*     (2006.01)

(52) U.S. Cl.
CPC ........ *A61B 5/14532* (2013.01); *A61B 5/0205* (2013.01); *A61B 5/02416* (2013.01); *A61B 5/7289* (2013.01); *G06N 3/02* (2013.01)

(58) Field of Classification Search
CPC .......... G06N 3/0464; G06N 3/02; G06N 3/08; A61B 5/14532; A61B 5/02416; A61B 5/1455; A61B 5/7267; A61B 5/7257
See application file for complete search history.

(56) References Cited

U.S. PATENT DOCUMENTS

| 2018/0364262 A1* | 12/2018 | Malka ................. G01N 33/723 |
| 2019/0282179 A1* | 9/2019 | Newberry ............. A61B 5/4839 |
| 2023/0036114 A1* | 2/2023 | Whitehill ............. A61B 5/6898 |

FOREIGN PATENT DOCUMENTS

| EP | 2544124 A1 | | 1/2013 |
| KR | 20220099759 | * | 1/2021 |
| TW | I678630 B | | 8/2019 |

* cited by examiner

*Primary Examiner* — Eric F Winakur
*Assistant Examiner* — Noah M Healy
(74) *Attorney, Agent, or Firm* — Rei-Cheng Jason Hsu

(57) ABSTRACT

The PPG based NIBG neural network prediction system of the present invention comprises a neural network configured to predict BG level of a subject based on PPG signal obtained from the subject wherein the subject is not undergoing medical treatment and the neural network is trained using training data from subjects not undergoing medical treatment. In another embodiment, the PPG based NIBG neural network prediction system of the present invention predicts BG level of a subject based on HbA1c of the subject measured using conventional finger prick method as well as PPG signal obtained from the subject wherein the subject is not undergoing medical treatment and the neural network is trained using training data from subjects not undergoing medical treatment.

27 Claims, 29 Drawing Sheets

PHOTOPLETHYSMOGRAPHY BASED NON-INVASIVE BLOOD GLUCOSE PREDICTION BY NEURAL NETWORK

FIELD OF THE INVENTION

The present invention is generally related to a non-invasive system and method for predicting blood glucose level of a subject using neural network.

BACKGROUND OF THE INVENTION

Accurate and reliable non-invasive blood glucose (NIBG) measuring technique has long been in demand and extensively studied. While finger-prick blood glucose (BG) measurement causes pain and discomfort due to the invasive nature and introduces the risk of infections [1, 2], NIBG technology can improve the quality-of-life in diabetic patients greatly by alleviating the pain of invasive measurement regularly [3-8]. Among the investigated NIBG measurements, photoplethysmography (PPG) has been long anticipated since this technique is simple, low cost, already commonly available on various wearable devices [9-15], and have been successfully applied to measuring oxygen saturation (SpO2) and pulsation rate clinically. PPG device measures the changes in transmittance or reflectance of near-infrared when blood passes through peripheral capillaries. It is known that the light absorption and reflectance of specific wavelengths are sensitive to the body's hemodynamic properties, which are highly correlated to the healthy status of the cardiovascular system that is influenced by BG level on a long term basis, and are directly measurable as pulse morphological profiles [9, 11, 13, 16]. As a result, finding the correlation of PPG pulse morphology and BG level could be a viable way towards NIBG prediction.

Previous studies on post-analysis of NIBG measurements cover various different machine learning models such as support vector machine (SVM)[17], Random forest [18], K-nearest neighbor (KNN) [19], Gaussian process regression (GPR)[20], and artificial neural network (ANN)[21]. Many morphological profiles and heart-rate-variance (HRV) features extracted from PPG signals are correlated to vascular function [22] and autonomic neuropathy [23] of the human body. Different signal processing methods such as fast Fourier transform (FFT), Kaiser-Teager energy (KTE), and spectral entropy were also exploited to extract features in different domains[9]. It is observed that, even though these results were claimed to be promising with their limited number of testing subjects, none of them have yet been successfully applied to commercial products for clinical usage. This suggests that the applicability of their approaches in a wide population of human beings might be quite limited.

Based on this observation, it is likely that a large data set comprises yet undocumented variations so that a single universal model is not adequate to cover all the cases and may lead to reduced accuracy. Therefore, there is a need for a neural network model capable of accurate NIBG prediction using PPG signal for a predetermined subset of the population.

SUMMARY OF THE INVENTION

The present invention provides a photoplethysmography (PPG) based non-invasive blood glucose (NIBG) prediction system comprising a signal reader configured to read one or more PPG signals from a subject; and a processor which, in turn, comprises a neural network wherein the processor is configured to perform signal processing on the one or more PPG signals read by the signal reader; wherein the processor is configured to predict a subject's blood glucose level using the neural network; wherein the input to the neural network comprises the signal processing results by the processor of the one or more PPG signals; wherein the neural network is trained using training data obtained from cohort not undergoing any medical treatments; and wherein the subject is not undergoing any medical treatments.

The present invention also provides a method for PPG based non-invasive blood glucose (NIBG) prediction comprising the steps of reading one or more PPG signals from a subject; obtaining HbA1c from the subject using conventional finger prick method; processing the one or more PPG signals; training a neural network; and predicting blood glucose level of the subject using the trained neural network wherein input to the neural network comprises the HbA1c and the processing results of the one or more PPG signals; wherein the training step is performed using HbA1c and PPG signal data obtained from cohort not undergoing any medical treatments; and wherein the subject is not undergoing any medical treatments.

BRIEF DESCRIPTION OF THE DRAWINGS

FIG. 3A depicts a general structure of the NN 230 of the PPG based NIBG prediction system of the present invention. FIG. 3B depicts an embodiment of the convolution neural network (CNN) 301 of the PPG based NIBG prediction system of the present invention comprising a single CNN module. FIG. 3C depicts an embodiment of the CNN 302 of the PPG based NIBG prediction system of the present invention comprising two CNN modules in parallel. FIG. 3D depicts an embodiment of the fully connected neural network (FCNN) 301 of the present invention.

FIG. 4A depicts an exemplary PPG signal of the present invention. FIG. 4B depicts an exemplary PPG signal of the present invention filtered by a low pass filter. FIG. 4C depicts an exemplary PPG signal of the present invention filtered by a high pass filter. FIG. 4D depicts an exemplary signal window derived from the PPG signal of the present invention facilitated by low and high pass filters.

FIG. 8A depicts CEG analysis of the model of FIG. 3C with all subjects and training cohort (undergoing as well as not undergoing medical treatment) and with PPG signal and the 16 features but without HbA1c included as input; FIG. 8B depicts CEG analysis of the model of FIG. 3C with all subjects and training cohort (undergoing as well as not undergoing medical treatment) and with PPG signal, the 16 features and HbA1c included as input; FIG. 8C depicts CEG analysis of the model of FIG. 3C with subjects and trained with training cohort undergoing medical treatment and with PPG signal and the 16 features but without HbA1c included as input; FIG. 8D depicts CEG analysis of the model of FIG. 3C subjects and trained with training cohort undergoing medical treatment and with PPG signal, the 16 features and HbA1c included as part of the input.

FIG. 9A depicts learning curve for the model of FIG. 3C of the present invention with all subjects (undergoing as well as not undergoing medical treatment) and with PPG signal and the 16 features but without HbA1c included as input, FIG. 9B depicts the model of FIG. 3C of the present invention with all subjects (undergoing as well as not undergoing medical treatment) and with PPG signal, the 16 features and HbA1c included as input, FIG. 9C depicts the learning curves of the model of FIG. 3C of the present invention with only subjects undergoing medical treatment and with PPG signal and the 16 features but without HbA1c included as input, FIG. 9D depicts the learning curves of the model of FIG. 3C of the present invention with only subjects undergoing medical treatment and with PPG signal, the 16 features and HbA1c included as input, FIG. 9E depicts the learning curves of the model of FIG. 3C of the present invention for only subjects not undergoing any medical treatment and with PPG signal and the 16 features but without HbA1c included as input, FIG. 9F depicts the learning curves of the model of FIG. 3C of the present invention for only subjects not undergoing medical treatment and with PPG signal, the 16 features and HbA1c included as input. In each case, the best and worst trainings among the 10 trainings are presented.

FIG. 10A depicts CEG analysis of the model of FIG. 3B using as input PPG signal from training cohort not undergoing any medical treatment; FIG. 10B depicts CEG analysis of the model of FIG. 3B using as input PPG signal only from subjects not undergoing any medical treatment and model trained using PPG signal from training cohort not undergoing any medical treatment.

FIG. 10C depicts CEG analysis of the model of FIG. 3B using as input PPG signal only from training cohort undergoing medical treatment; FIG. 10D depicts CEG analysis of the model of FIG. 3B using as input PPG signal only from subjects undergoing medical treatment and model trained using PPG signal from training cohort undergoing medical treatment.

FIG. 11A depicts CEG analysis of the model of FIG. 3B using as input PPG signal and the 16 features only from training cohort not undergoing any medical treatment; FIG. 11B depicts CEG analysis of the model of FIG. 3B using as input PPG signal and the 16 features only from subjects not undergoing any medical treatment and model trained using PPG signal and the 16 features from training cohort not undergoing any medical treatment.

FIG. 11C depicts CEG analysis of the model of FIG. 3B using as input PPG signal and the 16 features only from training cohort undergoing medical treatment; FIG. 11D depicts CEG analysis of the model of FIG. 3B using as input PPG signal and the 16 features only from subjects undergoing medical treatment and model trained using PPG signal and the 16 features from training cohort undergoing medical treatment.

FIG. 12A depicts CEG analysis of the model of FIG. 3B using as input PPG signal and HbA1c only from training cohort not undergoing any medical treatment; FIG. 12B depicts CEG analysis of the model of FIG. 3B using as input PPG signal and HbA1c only from subjects not undergoing any medical treatment and model trained using PPG signal and HbA1c from training cohort not undergoing any medical treatment.

FIG. 12C depicts CEG analysis of the model of FIG. 3B using as input PPG signal and HbA1c only from training cohort undergoing medical treatment; FIG. 12D depicts CEG analysis of the model of FIG. 3B using as input PPG signal and HbA1c only from subjects undergoing medical treatment and model trained using PPG signal and HbA1c from training cohort undergoing medical treatment.

FIG. 13A depicts CEG analysis of the model of FIG. 3B using as input PPG signal, the 16 features and HbA1c only from training cohort not undergoing any medical treatment; FIG. 13B depicts CEG analysis of the model of FIG. 3B using as input PPG signal, the 16 features and HbA1c only from subjects not undergoing any medical treatment and model trained using PPG signal, the 16 features and HbA1c from training cohort not undergoing any medical treatment.

FIG. 13C depicts CEG analysis of the model of FIG. 3B using as input PPG signal, the 16 features and HbA1c only from cohort undergoing medical treatment; FIG. 13D depicts CEG analysis of the model of FIG. 3B using as input PPG signal, the 16 features and HbA1c only from subjects undergoing medical treatment and model trained using. PPG signal, the 16 features and HbA1c from training cohort undergoing medical treatment.

FIG. 14A depicts CEG analysis of the model of FIG. 3D using as input PPG signal and HbA1c only from training cohort not undergoing any medical treatment; FIG. 14B depicts CEG analysis of the model of FIG. 3D using as input PPG signal and the 16 features only from subjects not undergoing any medical treatment and trained using PPG signal and the 16 features from training cohort not undergoing any medical treatment.

FIG. 14C depicts CEG analysis of the model of FIG. 3D using as input PPG signal and the 16 features only from training cohort undergoing medical treatment; FIG. 14D depicts CEG analysis of the model of FIG. 3D using as input PPG signal and the 16 features only from subjects undergoing medical treatment and model trained using PPG signal and HbA1c from training cohort undergoing medical treatment.

FIG. 15A depicts CEG analysis of the model of FIG. 3B using as input PPG signal, the 16 features and HbA1c only from training cohort undergoing medical treatment; FIG. 15B depicts CEG analysis of the model of FIG. 3D using as input PPG signal, the 16 features and HbA1c only from subjects undergoing medical treatment and model trained using PPG signal, the 16 features and HbA1c from training cohort not undergoing medical treatment.

FIG. 15C depicts CEG analysis of the model of FIG. 3D using as input PPG signal, the 16 features and HbA1c only from training cohort undergoing medical treatment; FIG. 15D depicts CEG analysis of the model of FIG. 3D using as input PPG signal, the 16 features and HbA1c only from subjects undergoing medical treatment and model trained using PPG signal, the 16 features and HbA1c from training cohort undergoing medical treatment.

DETAILED DESCRIPTION OF THE INVENTION

The compositions of the present invention can comprise, consist of, or consist essentially of the essential elements and limitations of the invention described herein, as well as any of the additional or optional ingredients, components, or limitations described herein.

As used in the specification and claims, the singular form "a" "an" and "the" include plural references unless the context clearly dictates otherwise. For example, the term "a" cell includes a plurality of cells, including mixtures thereof.

"About" in the context of amount values refers to an average deviation of maximum ±20%, ±10% or ±5% based on the indicated value. For example, an amount of about 30 mol % anionic lipid refers to 30 mol %±6 mol %, 30 mol %±3 mol % or 30 mol %±1.5 mol % anionic lipid with respect to the total lipid/amphiphile molarity.

A "subject," "individual" or "patient" is used interchangeably herein, which refers to a vertebrate, preferably a mammal, more preferably a human.

"Neural network," a subset of Artificial Intelligence (AI), comprises a network of nodes each capable of communication with one or more other nodes wherein each nodes of the network acts as a neuron able to learn and mimic the human thinking process. The neural network typically comprises an input layer, one or more hidden layers and an output layer. Various neural network frameworks may comprise but not limited to Caffee, Keras, Microsoft Cognitive Toolkit, MXNET, DeepLearning4j, Chainer and TensorFlow. Deep learning neural network is a subset of neural network comprising three or more hidden layers.

The term "photoplethysmography (PPG)" is an optically obtained plethysmogram that can be used to detect blood volume changes in the microvascular bed of tissue.[1] [2] A PPG is often obtained by using a pulse oximeter which illuminates the skin and measures changes in light absorption.[3] A conventional pulse oximeter monitors the perfusion of blood to the dermis and subcutaneous tissue of the skin.

Figure 5A:
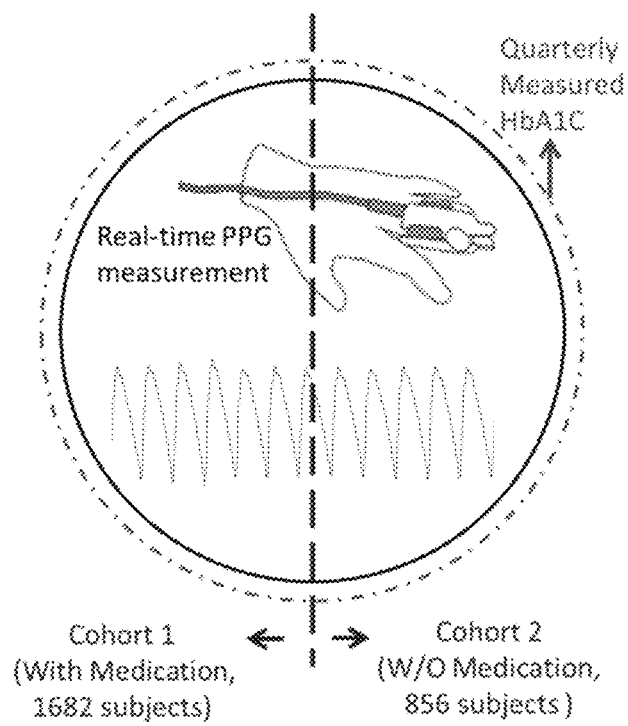
FIG. 5A depicts a visual representation of the PPG based NIBG prediction system and method of the present invention.
Figure 5B:
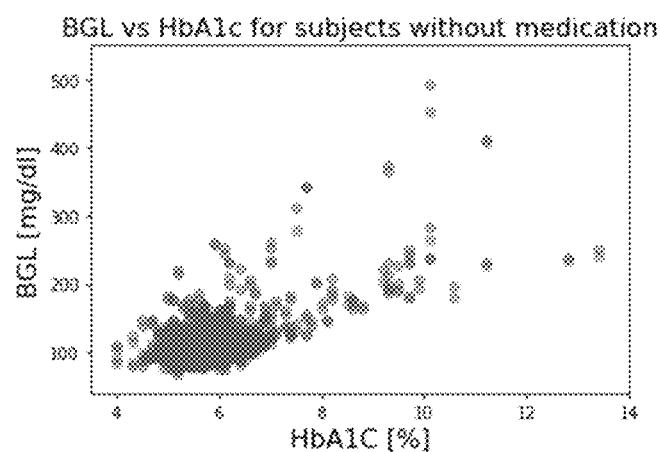
FIG. 5B illustrates correlation of HbA1c and blood glucose level for subjects undergoing medical treatment.
Figure 5C:
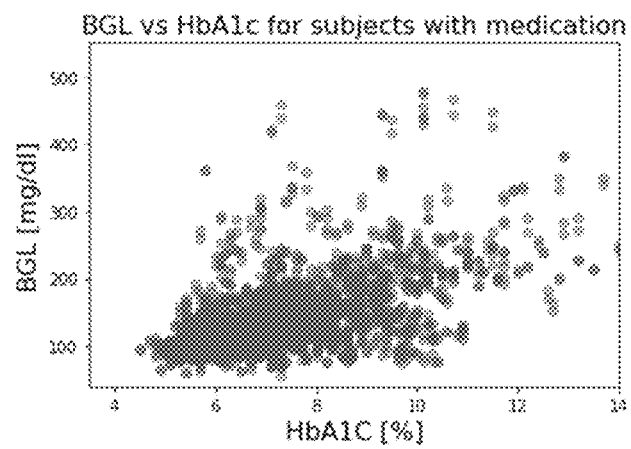
FIG. 5C illustrates correlation of HbA1c and blood glucose level for subjects not undergoing any medical treatment.

"HbA1c" is the hemoglobin in the bloodstream that becomes chemically bonded with glucose over time. It has been recognized as one of the powerhouse indexes on diagnosing diabetes and identifying prediabetes by the American Diabetes Association. Measuring HbA1c level can help one to determine their average BG level and can be conducted at any time without prior dietary preparation (e.g., fasting). Unlike blood glucose tests, HbA1c is not affected by day-to-day variability. HbA1c value can be represented in either Diabetes Control and Complication Trial units (DCCT, %), or International Federation of Clinical Chemistry units (IFCC, mmol/mol). For the present disclosure, all HbA1c values are reported in the DCCT units with percentage (%). The measured HbA1c reflects the average blood glucose level of approximately the past three months due to the limited lifespan of red blood cells. The recommended cut-off value of HbA1c for diagnosing diabetes is at 6.5%. But HbA1c value less than 6.5% does not rule out the possibility of diabetes [24]. Although there exists a correlation between HbA1c and BG level, they are not directly interchangeable, as shown in FIGS. 5B and 5C. Since HbA1c only needs to be measured quarterly, which should not cause too much discomfort and inconvenience, thus it is acceptable to be adopted in our model building.

The phrase "medical treatment" includes any medical procedures, drug or drug regimen regulated by the United States Food and Drug Administration and/or European Medicines Agency as a medical procedure, drug or drug regimen.

The present invention provides a PPG based non-invasive blood glucose (NIBG) neural network prediction system developed based on the finding that a single universal model for PPG based NIBG prediction can not adequately cover all possible variations for all possible subjects, reducing overall accuracy of NIBG prediction. One such major variation stems from a subject's medical treatment which is shown to have significant negative effect on NIBG prediction accuracy in the Examples in connection with FIGS. 8A-F, 10-13 and 14-15. Specifically, since PPG based NIBG prediction relies on the correlation of BG level with PPG signal obtained from the subject as a representation of the subject's cardiovascular system, medical treatment on cardiovascular disease may influence the cardiovascular system and, therefore, the PPG signal such that its correlation to blood glucose (BG) level is substantially altered or even eliminated.

Therefore, in an embodiment the PPG based NIBG neural network prediction system of the present invention comprises a neural network configured to predict BG level of a subject based on PPG signal obtained from the subject wherein the subject is not undergoing medical treatment that can affect the subject's cardiovascular system and the neural network is trained using training data from training cohort not under medical treatment that can affect cardiovascular system wherein the training data is based upon PPG signal and reference BG obtained from the training cohort. In another embodiment, the PPG based NIBG neural network prediction system of the present invention predicts BG level of a subject based on HbA1c of the subject measured using conventional finger prick method as well as PPG signal obtained from the subject wherein the subject is not undergoing medical treatment that can affect the subject's cardiovascular system and the neural network is trained using training data from training cohort not undergoing medical treatment that can affect the cardiovascular system wherein the training data is based upon PPG signal, HbA1c and reference BG obtained from the training cohort. In an embodiment, medical treatments that can affect cardiovascular system comprises high blood pressure and high blood pressure prevention related drugs and treatments, stroke and stroke prevention drugs and treatments and heart attack and heart attack prevention drugs and treatments that are regulated by the United States FDA and or European Medicine Agency. In an embodiment, medical treatments that can affect cardiovascular system consists of high blood pressure and high blood pressure prevention related drugs and treatments, stroke and stroke prevention drugs and treatments and heart attack and heart attack prevention drugs and treatments that are regulated by the United States FDA and or European Medicine Agency.

Moreover, any medical treatments not directly affecting the cardiovascular system such as diabetes drugs or treatments such as insulin injections can also be used as a criteria to exclude a subject and training cohort to improve accuracy of BG prediction. Therefore, in an embodiment, medical treatments used to exclude subject and training cohort for the present invention comprise medical treatments that can affect cardiovascular system as defined above as well as medical treatment related to diabetes that are regulated by the United States FDA and or European Medicine Agency such as insulin injections.

Furthermore, in an embodiment, to more precisely confine the method and system of the present invention's prediction accuracy, subjects or training cohort undergoing any medical treatments are excluded regardless of whether the medical treatment affects cardiovascular system or is used for treating diabetes. Such medical treatment includes any medical treatment, drug or drug regimen recognized as medical treatment, drug or drug regimen by the United States Food and Drug Administration and/or the European Medicines Agency regardless of whether the medical treatment affects cardiovascular system or are for treating diabetes. Therefore, in an embodiment the PPG based NIBG neural network prediction system of the present invention comprises a neural network configured to predict BG level of a subject based on PPG signal obtained from the subject wherein the subject is not undergoing any medical treatment and the neural network is trained using training data from cohort not undergoing any medical treatment wherein the training data is based upon PPG signal obtained from the training cohort. In another embodiment, the PPG based NIBG neural network prediction system of the present invention predicts BG level of a subject based on HbA1c of the subject measured using conventional finger prick method as well as PPG signal obtained from the subject wherein the subject is not undergoing any medical treatment and the neural network is trained using training data from cohort not undergoing any medical treatment wherein the training data is based upon PPG signal, HbA1c and reference BG obtained from the training cohort.

Figure 1:
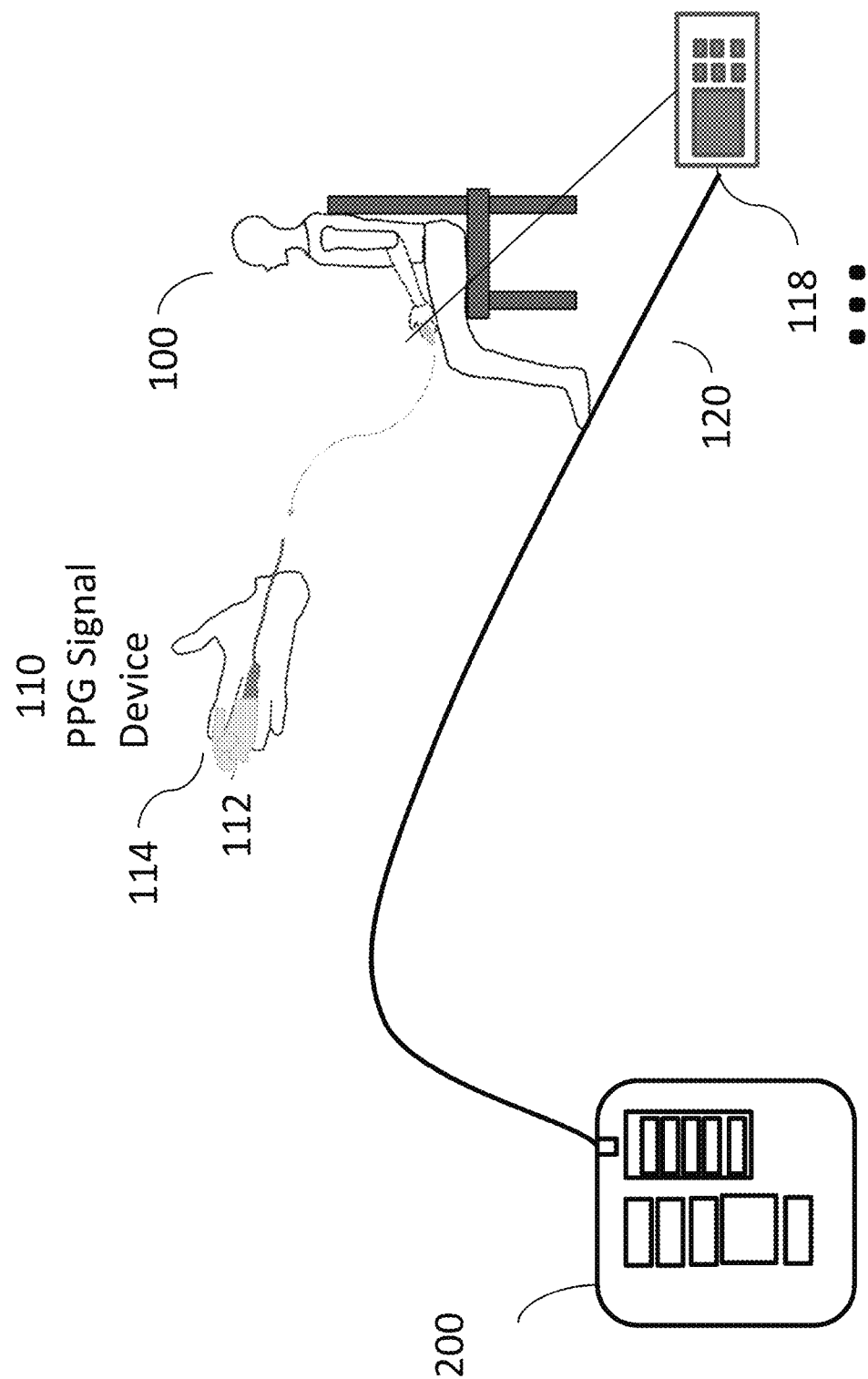
FIG. 1 depicts a general overview of an embodiment of the PPG based NIBG neural network prediction system of the present invention.

FIG. 1 illustrates an embodiment of the PPG based NIBG neural network prediction system of the present invention. As shown in FIG. 1, the system of the present invention comprises subject 100, PPG signal device 110, connector 120 and processor 200. In an embodiment, the subject 100 comprises a person whose blood glucose level is to be predicted using the system and method of the present invention and is not undergoing any medical treatment that can affect his or her cardiovascular system and/or is not undergoing medical treatment for diabetes. In an embodiment, the subject 100 comprises a person whose blood glucose level is to be predicted using the system and method of the present invention and is not undergoing any medical treatment.

In an embodiment, the PPG signal device 110 comprises a PPG signal reader 112, signal emitter 114 and a signal module 118. The PPG signal reader 112 is configured to read signals emanating from the subject 100. The signal device 110 may further comprise a signal emitter 114 for outputting signals that pass through the body of the subject 100, then emanate out from the subject 100 to be read by the signal reader 112.

The signal device 110 further comprises a signal module 118 configured to communicate with and control the signal reader 112 and signal emitter 114. The signal module 118 may also comprise one or more control panels that allow a user to control incoming and outgoing signals such as triggering signals and/or capturing signals.

Connector 120 is configured to allow communication between the signal device 110 and the processor 200. In an embodiment, the connector 120 may transmit the signal read by the signal device 110 to the processor 200 as well as transmit commands from the processor 200 to the signal device 110 to command the signal module 118 to trigger and/or read signals. In one embodiment, the connector 120 may be a physical wire. In another embodiment, the connector 120 may be a wireless connection such as those using Wi-Fi or Bluetooth technology.

Figure 2:
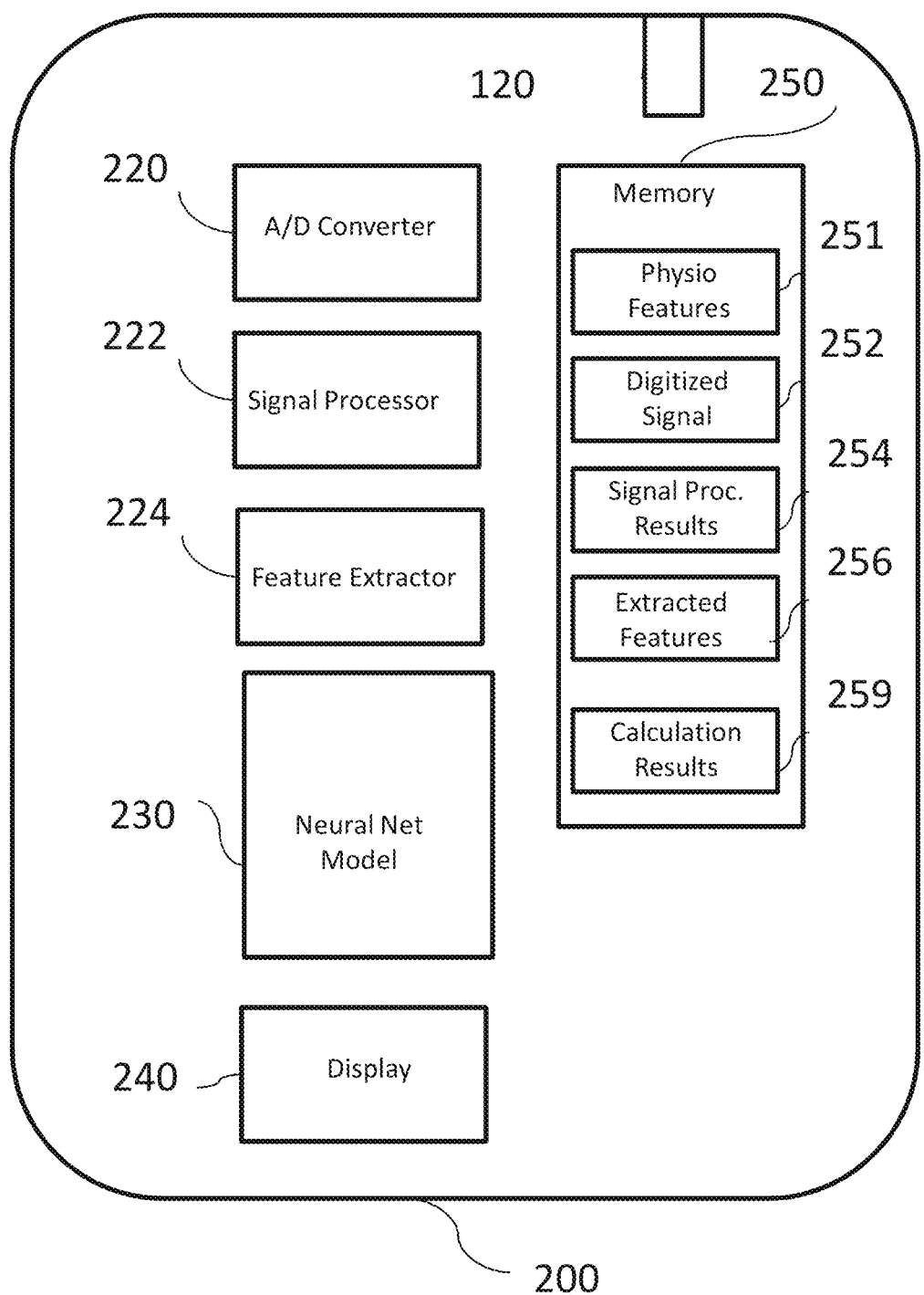
FIG. 2 depicts in detail an embodiment of the processor 200 of the PPG based NIBG neural network prediction system of the present invention.

FIG. 2 illustrates processor 200 in further detail. As shown in FIG. 2, processor 200 comprises an analogue to digital converter (A/D converter) 220, signal processor 222, feature extractor 224, neural network 230, display 240 and memory 250.

It should be noted that components of the processor 200 described may reside in one single device as illustrated in FIG. 2 or reside in separate devices or in a cloud. For example, the analogue to digital converter 220, the signal processor 222, the feature extractor 224, the neural network 230 and/or memory 250 may each or in various combinations be a stand-alone device or part of a cloud. Furthermore, display 240 which is configured to allow user input into processor 200 such as via onscreen input as well as display information such as physiological measurements and/or HbA1C may be a stand-alone device.

The A/D converter 220 is configured to digitize the analogue signal transmitted to the processor 200 into digitized signal 252 which may be stored in memory 250. The signal processor 222 is configured to process the digitized signal 252 to facilitate extraction of features from the PPG signal. For example, in an embodiment, the signal processor 222 may be configured to decompose the signal into AC and DC components, perform Fourier transformation, etc. . . . in order to facilitate analysis and further processing of PPG signals such as digitization of the PPG signals into signal windows and extraction of features 256 from the digitized signal 252 as described in further detail below in connection with FIG. 4. The signal processing results 254 may be stored in memory 250.

Figure 3A:
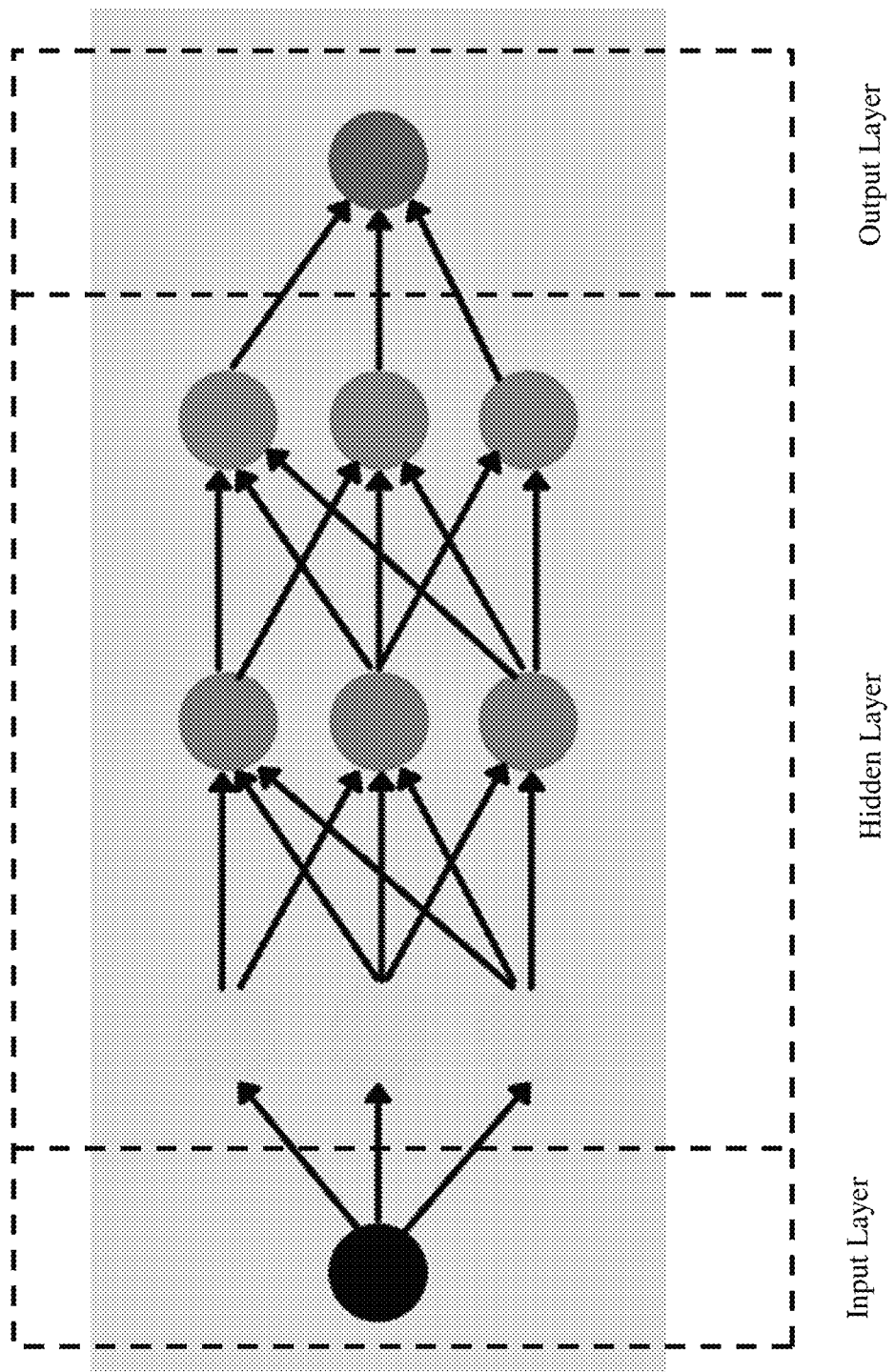
FIGS. 3A-D depict four embodiments of the neural network (NN) of the PPG based NIBG prediction system of the present invention.

FIGS. 3A-D illustrates various embodiments of the neural network 230 of the present invention. As shown in FIG. 3A, an embodiment of the neural network 230 of the present invention comprises an input layer, one or more hidden layers and an output layer. In an embodiment, the input layer is configured to receive one or more inputs such as one or more input vectors or matrices. In an embodiment, each hidden layer comprises one or more nodes wherein each node has an associated weight and bias that may be adjusted during training phase of the model to optimize prediction accuracy. In an embodiment, each node connects to one or more nodes of a different hidden layer. In an embodiment, if the output of any individual node is above the specified threshold value, that node is activated, sending data to the next layer of the network; otherwise, no data is passed along to the next layer of the network. In an embodiment, the neural network of the present invention comprises any number of hidden layers. In an embodiment, the neural network of the present invention comprises 1 to 10 hidden layers such as 1 layer, 2 layers, 3 layers, 4 layers, 5 layers, 6 layers, 7 layers, 8 layers, 9 layers or 10 layers including all ranges and numbers falling within these values.

In an embodiment, the input of the NN 230 of the present invention may comprise one or more vectors or matrices that, in turn, comprises signal window of the PPG signal, HbA1c measured using conventional finger-prick method, various features or a combination thereof. In an embodiment, the input to the NN 230 of the present invention comprises one or more 1 d vectors that, in turn, comprises signal window of the PPG signal, HbA1c measured using conventional finger-prick method, various features or a combination thereof. The features are discussed in further details below.

In an embodiment, the NN 230 of the present invention is trained using training data such as PPG signal and Hba1c and/or reference BG level obtained using convention finger prick method from training cohort not undergoing any medical treatment that can affect his or her cardiovascular system as recognized as having such an effect on the cardiovascular system by the United States Food and Drug Administration and/or European Medicines Agency and/or not undergoing any medical treatment for treating diabetes. In an embodiment, the NN 230 of the present invention is trained using training data such as PPG signal and HbA1c and/or reference BG level obtained using convention finger prick method from training cohort not undergoing any medical treatment. In an embodiment, training of the NN 230 of the present invention comprises minimizing loss as calculated by the total of differences between BGs predicted by the system of the present invention and the corresponding reference BGs. Various neural network frameworks for building NN 230 of the present invention comprises Caffee, Keras, Microsoft Cognitive Toolkit, MXNET, DeepLearning4j, Chainer and TensorFlow.

Figure 3B:
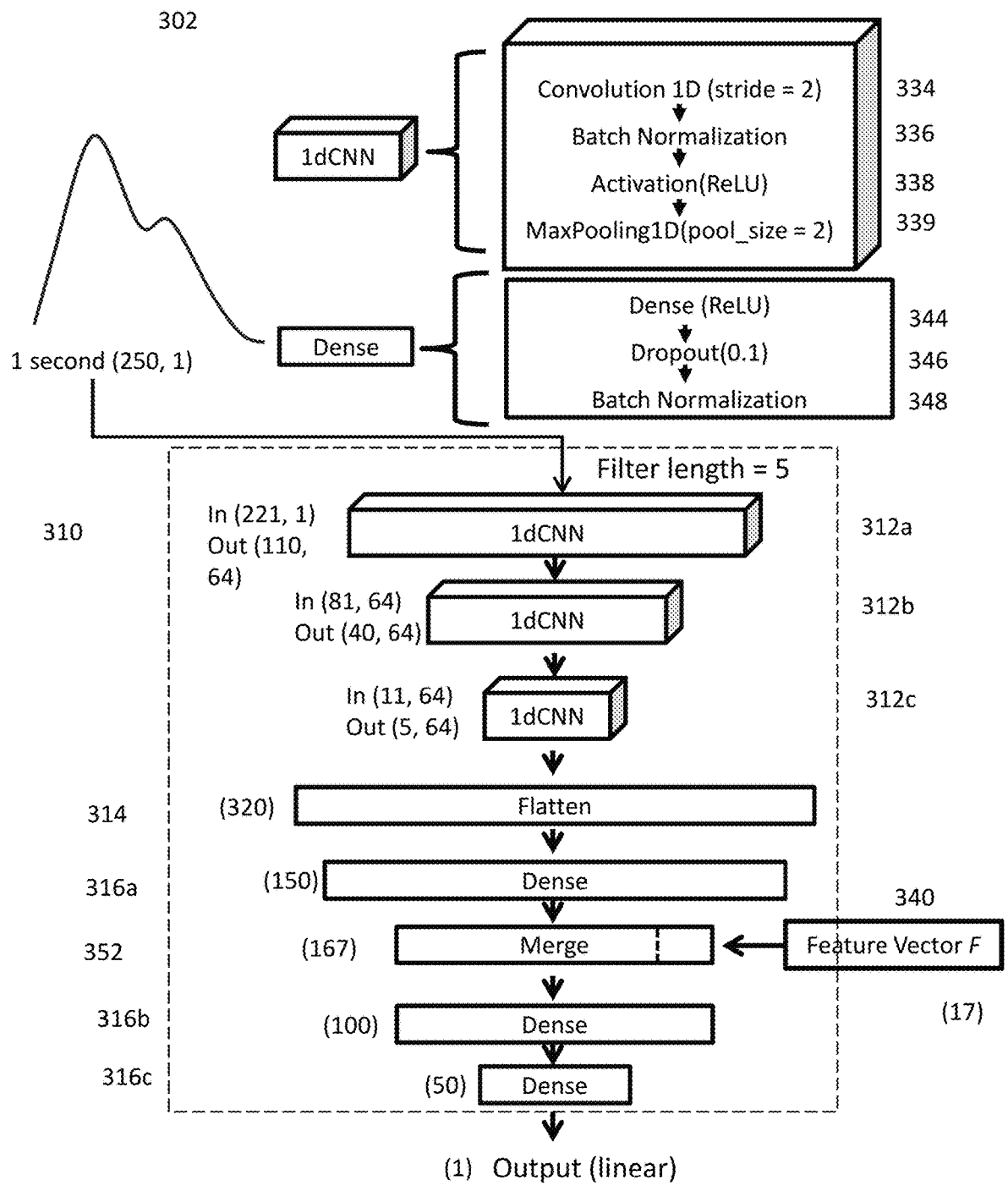

In an embodiment, the neural network 230 of the present invention may comprise a fully connected neural network (FCNN) 301. An embodiment of the fully connected neural network (FCNN) of the present invention is illustrated in FIG. 3D. As shown in FIG. 3D, an embodiment of the FCNN of the present invention comprises an input layer, a hidden layer and an output layer. In an embodiment, the input layer is configured to receive one or more inputs such as one or more vectors or matrices. In an embodiment, the input layer is configured to receive as input personal physiological features, pulse morphological features, heart rate variance features, HbA1c or a combination thereof. In an embodiment shown in FIG. 3D, the input layer is configured to receive as input feature vector F 340 which comprises the 16 features and HbA1c as described in further detail below and in connection with the Examples. As shown in FIG. 3D, the FCNN of the present invention comprises one or more hidden layers in which each hidden layer comprises a dense layer 306. In an embodiment, the dense layer 306 comprises one or more nodes in which each node is connected to each node of the preceding layer. In an embodiment, nodes of the dense layer perform operations that reduces dimension of the input to help identify important features for predicting BG. In an embodiment, nodes of the dense layer perform matrix-vector multiplication wherein the values of the matrix are trainable and maybe updated by back propagation. As shown in FIG. 3D, the FCNN of the present invention further comprises an output layer configured to output BG prediction.

In an embodiment, the neural network 230 of the present invention may comprise a convolution neural network (CNN). An embodiment of the CNN 302 of the present invention is illustrated in FIG. 3B. As shown in FIG. 3B, in an embodiment, the hidden layer of the CNN 302 of the present invention comprises convolution module 310. The convolution module 310 comprises one or more convolution layers 312 such as 312*a*, 312*b* and 312*c* as shown in FIG. 3B. In an embodiment, the convolution module 310 may comprise any number of convolution layers. In an embodiment, the convolution module 310 may comprise 1 to 10 convolution layers.

In an embodiment, each convolution layer 312 comprises a convolution submodule 334, batch normalization module 336, activation function module 338, pooling module 339 or a combination thereof. In an embodiment, the activation module 338 is configured to perform ReLU operation. In an embodiment, the pooling module 339 is configured to perform maxpooling or average pooling operation. In an embodiment, the convolution submodule 334 is configured to perform convolution operation using one or more filters on the one or more inputs or output from another convolution layer. In an embodiment, the filter may have any length. In an embodiment, the filter may have lengths of 1 to 500 such as 1, 5, 10, 15, 20, 30, 40, 60, 80, 100, 200, 250, 300, 350, 400, 450 or 500 including all ranges and numbers falling within these values.

In an embodiment, the input to the CNN 302 of the present invention may comprise one or more vectors or matrices that, in turn, comprises signal window derived from the PPG signal obtained from the subject, HbA1c measured using conventional finger-prick method, various features or a combination thereof as disclosed above. In an embodiment, the input to the CNN 302 of the present invention comprises a 1 d vector that, in turn, comprises signal window derived from the PPG signal, HbA1c measured using conventional finger-prick method, various features or a combination thereof as disclosed above. The output of the convolution sub module 334 may be further processed by the batch normalization module 336, activation function 338 and/or pooling module 339.

The convolution module 310 may further comprise a flatten module 314 and one or more dense layers 316. In an embodiment, the flatten module 314 is configured to reduce the dimension of the output of the convolution layers 312. Each convolution/module 310 further comprises one or more dense layers 316 configured to further identify important parts of the output from flatten layer 314. In an embodiment, each dense layer 316 comprises a dense activation module 344, a dropout module 346 and/or a batch normalization module 348. In an embodiment, a second input comprising HbA1c measured using conventional finger-prick method as well as various features may be separately input in the merge layer 352 configured to accept and process output from dense layer 316a and feature vector 340.

Figure 3C:
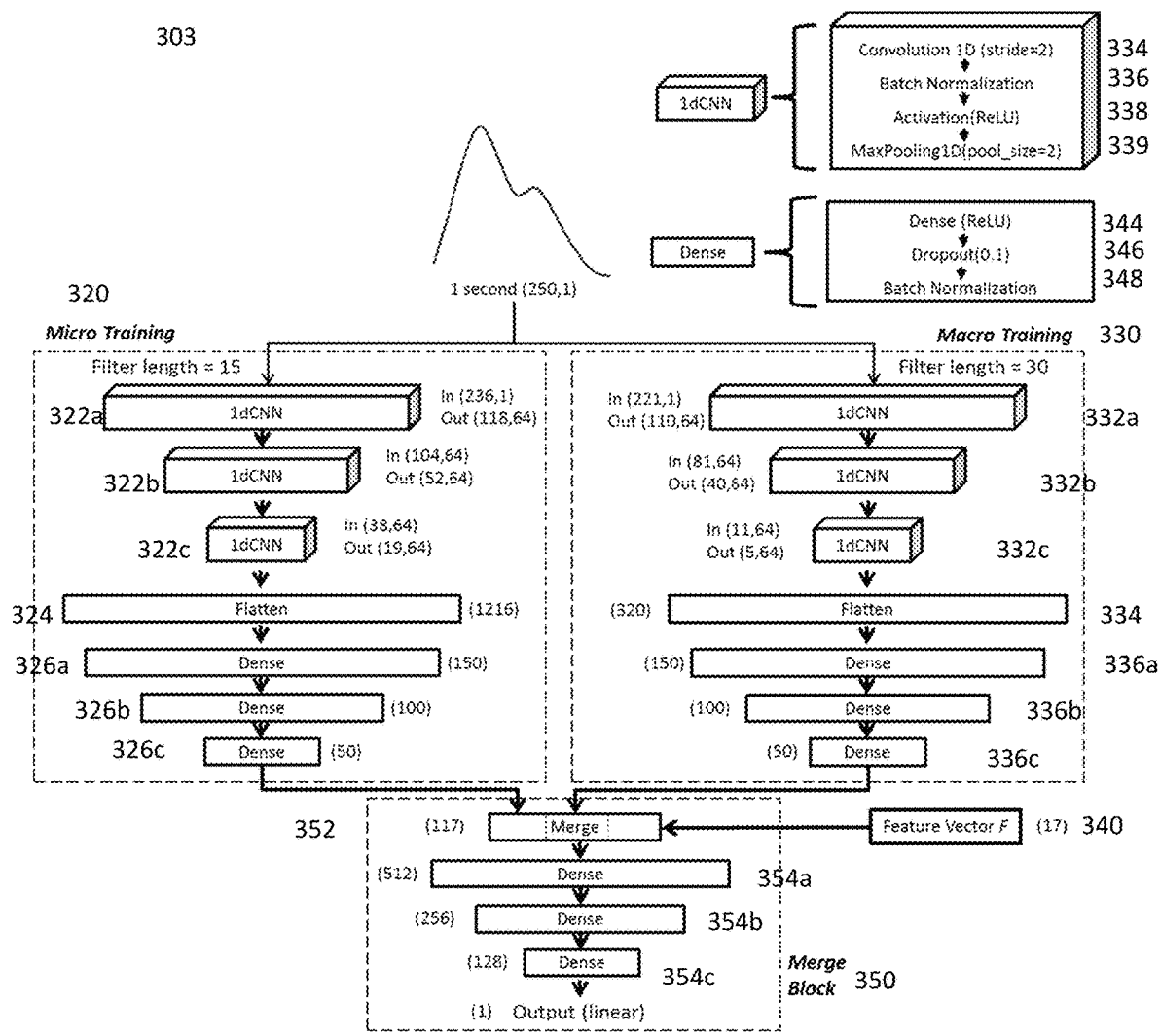
Figure 3D:
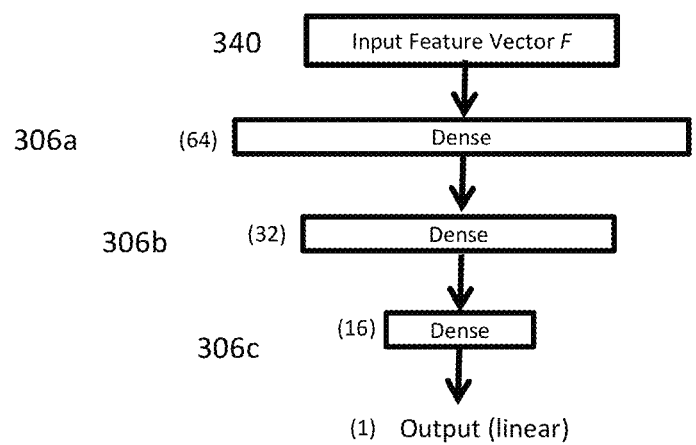

FIG. 3C illustrates another embodiment of the CNN 303 of the present invention with two convolution modules. As shown in FIG. 3C, in an embodiment, the hidden layer of the CNN 303 of the present invention comprises two convolution modules 320 and 330 in parallel wherein each convolution module has filter of different lengths. A smaller filter length is configured to capture more detailed level aspects of the input vector whereas a larger filter length is configured to capture higher level aspects of the input vector. Therefore, in an embodiment, the convolution module with shorter length filter may be referred to as micro convolution module 320 whereas the convolution module with longer length filter may be referred to as macro convolution module 330.

In an embodiment the structure of each convolution module 320, 330 is the same as convolution module 310 but the length of filter for the micro convolution module or the micro filter 321 is shorter than that of the macro filter 331. In an embodiment, the length of micro filter 331 is about ¼ to ¾ of the macro filter 31 such as ¼, ½ or ¾ including any ranges and numbers falling within these values. In an embodiment, the macro filter may have any length. In an embodiment, the macro filter may have lengths of 1 to 500 such as 1, 5, 10, 15, 20, 30, 40, 60, 80, 100, 200, 250, 300, 350, 400, 450 or 500 including all ranges and numbers falling within these values.

In an embodiment, the micro convolution module 320 comprises one or more micro convolution layers 322 such as 322a, 322b and 322c as shown in FIG. 3C. The macro convolution module 330 comprises one or more macro convolution layers 332 such as 332a, 332b and 332c as shown in FIG. 3C. In an embodiment, each convolution module 320, 330 may comprise 1 to 10 convolution layers.

Each convolution module 320, 330 may further comprise a flatten module 324, 334, one or more Dense layers 326, 336 or a combination thereof. In an embodiment, the flatten module 324, 334 is configured to reduce the dimension of the output of the convolution layers 322, 332. In an embodiment, each convolution module 320, 330 may further comprise one or more dense layers 326, 336 configured to further identify important parts of the output from flatten layer 324, 334. In an embodiment, each dense layer 326, 336 comprises a dense activation module 344, a dropout module 346, a batch normalization module 348, or a combination thereof.

In an embodiment, the convolution sub module 334 is configured to perform convolution operation using one or more filters on the one or more inputs or output from another convolution layer.

In an embodiment, the CNN 303 of the present invention further comprises a merge block module 350 configured to receive feature vector or matrix 340 as well as results of the micro and macro convolution modules 320, 330 in order to analyze and output a predicted BG level of the subject based on these inputs. In an embodiment, the merge block module 350 comprises a merge layer 352 that merges outputs from the two CNN modules and feature vector 340 for further processing. In an embodiment, the merge block module 350 further comprises one or more dense layers 354 configured to process the merged inputs to output a predicted BG level for the subject. In an embodiment, the feature vector or matrix 340 may comprise various features disclosed herein, including personal physiological features, pulse morphological features, heart rate variance features or a combination thereof.

The feature extractor 224 is configured to extract features from the digitized signal 252 and/or results of the signal processing 254. In an embodiment, extracted features 256 may comprise any features disclosed herein and may be used to create the feature vector 340 as input to the various embodiments of the NN 230 of the present invention.

In an embodiment, input for any embodiments of the NN 230 of the present invention may comprise several input types such as digitized segment of the PPG signal obtained from the subject, HbA1c measured using conventional finger-prick method, various features or a combination thereof. In an embodiment, the various input types for the NN 230 of the present invention may comprise one or more input vectors or matrices. For example, the digitized segment of the PPG signal may comprise one input vector or matrix while the features comprise a different input vector or matrix such as the feature vector 340. Alternatively, one or more input types may comprise one single input vector or matrix such that the digitized segment of the PPG signal and the features are concatenated to form one input vector or matrix. In an embodiment, each input vector or matrix comprises a one dimensional (1d) input vector. In another embodiment, the PPG signal comprises an input vector whereas the features including HbA1c comprises a separate vector such as the feature vector 340 wherein the PPG signal is directly input to the convolution modules and the features are input separately such as in the merge layer 352.

Figures 4A, 4B, 4C:
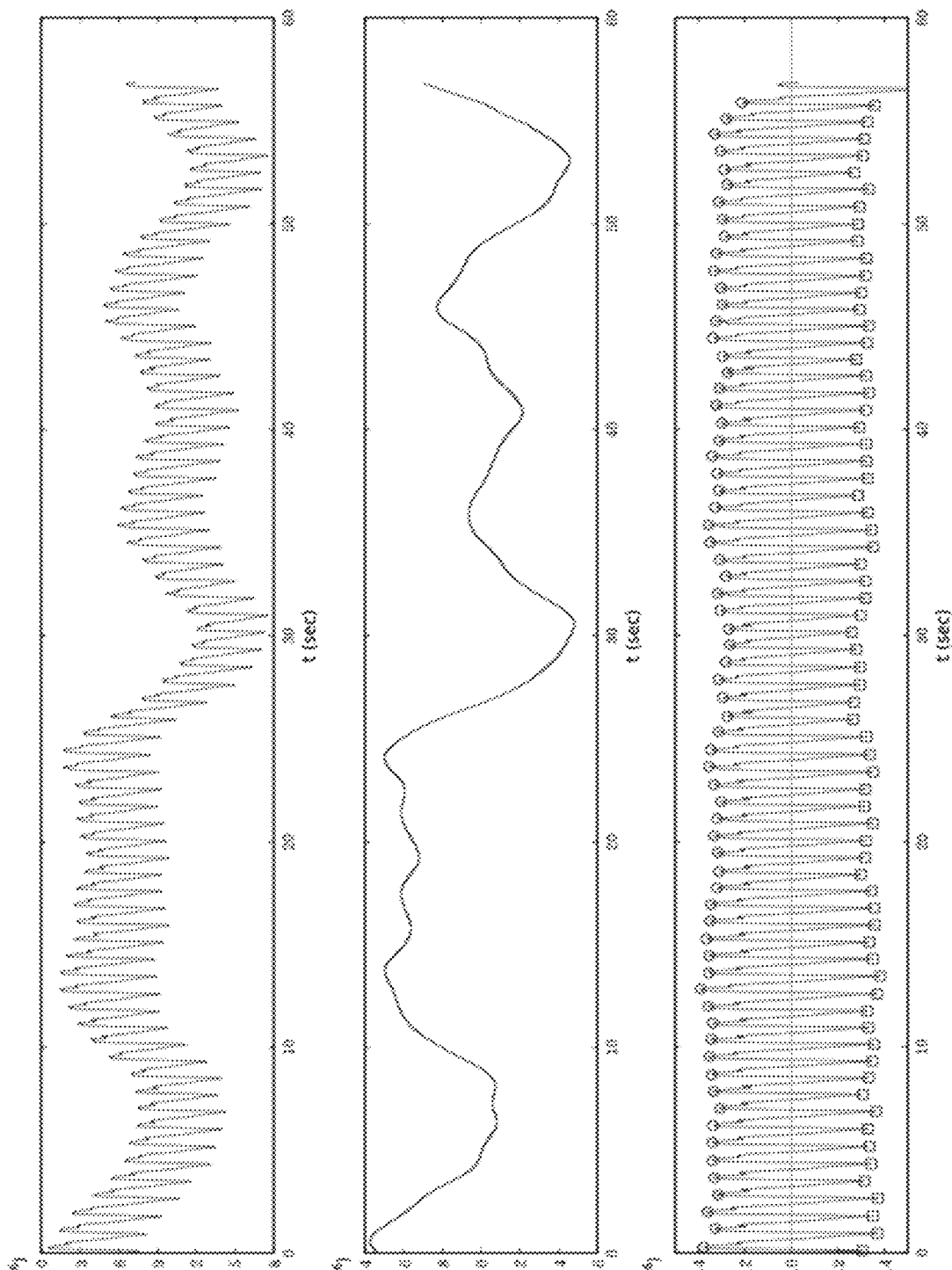
FIG. 4A-D depicts various PPG signal of the present invention.
Figure 4D:
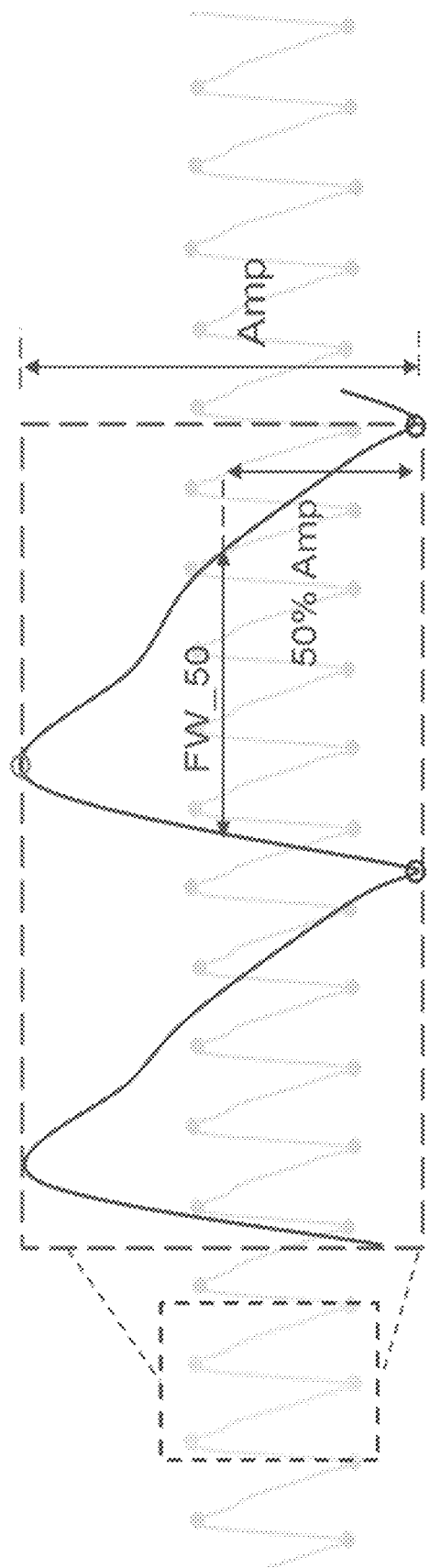

FIG. 4A illustrates an exemplary PPG signal. In an embodiment, the digitized segments of the PPG signal comprise signal windows as shown in FIG. 4D. In an embodiment, each signal window comprises or consists of a fixed time length of the PPG signal of about 1 second to about 20 seconds such as about 1 second, about 1.6 seconds about 2 seconds about 5 seconds about 10 seconds, about 15 second or about 20 seconds. In an embodiment, each signal window starts from each valley of the PPG signal such that, if a subject's heart beats 60 beats/second, then a 1-minute-long PPG signal would result in 60 signal windows. In an embodiment, the signal windows may be better defined using a frequency filter as illustrated in the FIGS. 4B and 4C to better identify peaks and troughs of the PPG signal as shown in FIG. 4D. In an embodiment, the valleys of the PPG waveform were identified using the Bigger-Fall-Side algorithm [26]. Then from each valley, a backwardly one-second-long segment (total of 250 data points) containing the pulse was extracted. Averaging over the pulses, it was used to represent the entire minute of the PPG signal for deep learning neural network. An example of a signal window of the present invention is illustrated in FIG. 4D.

Figure 6:
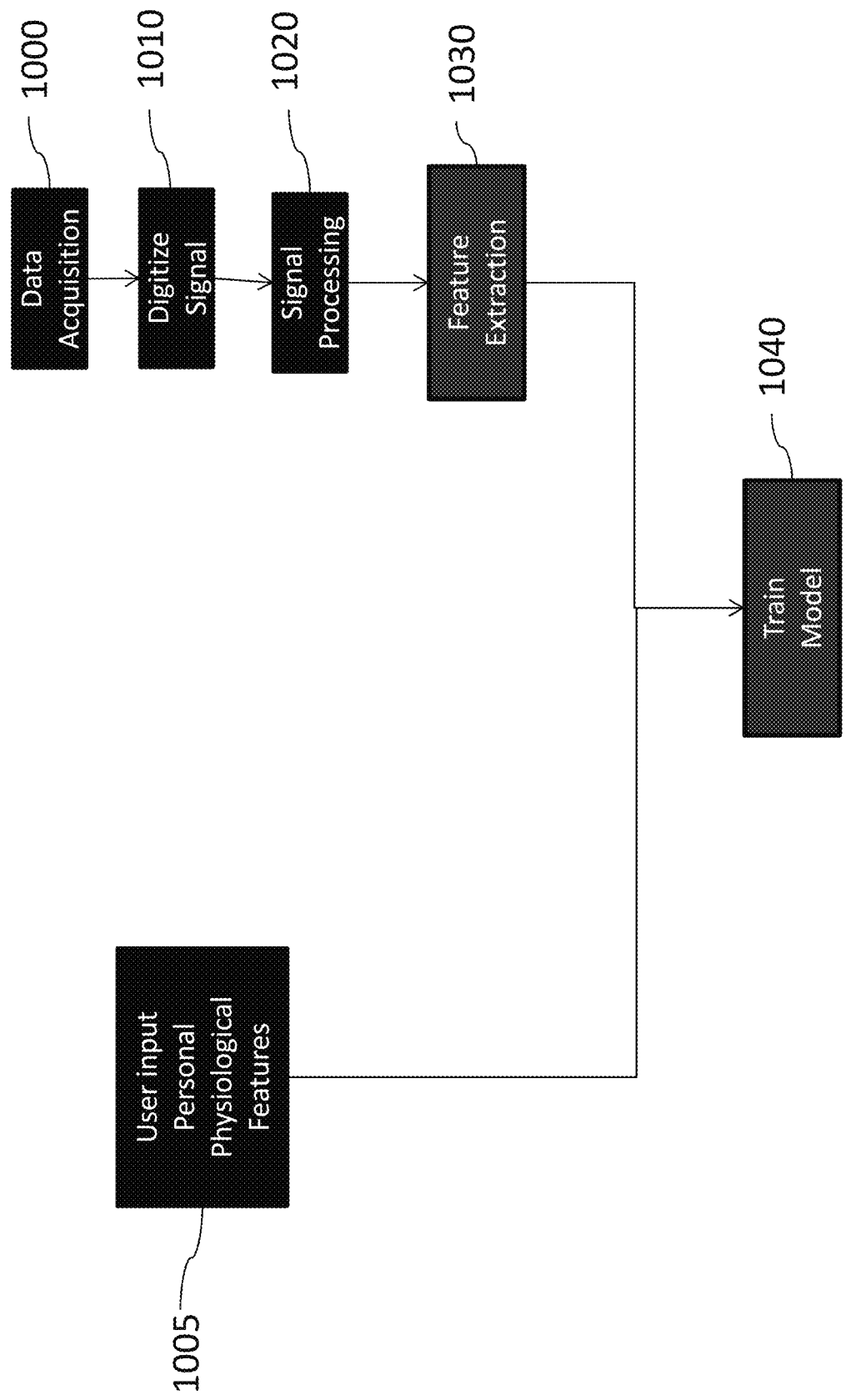
FIG. 6 illustrates an embodiment of the process flow of the training phase of the PPG based NIBG neural network prediction method of the present invention.
Figure 7:
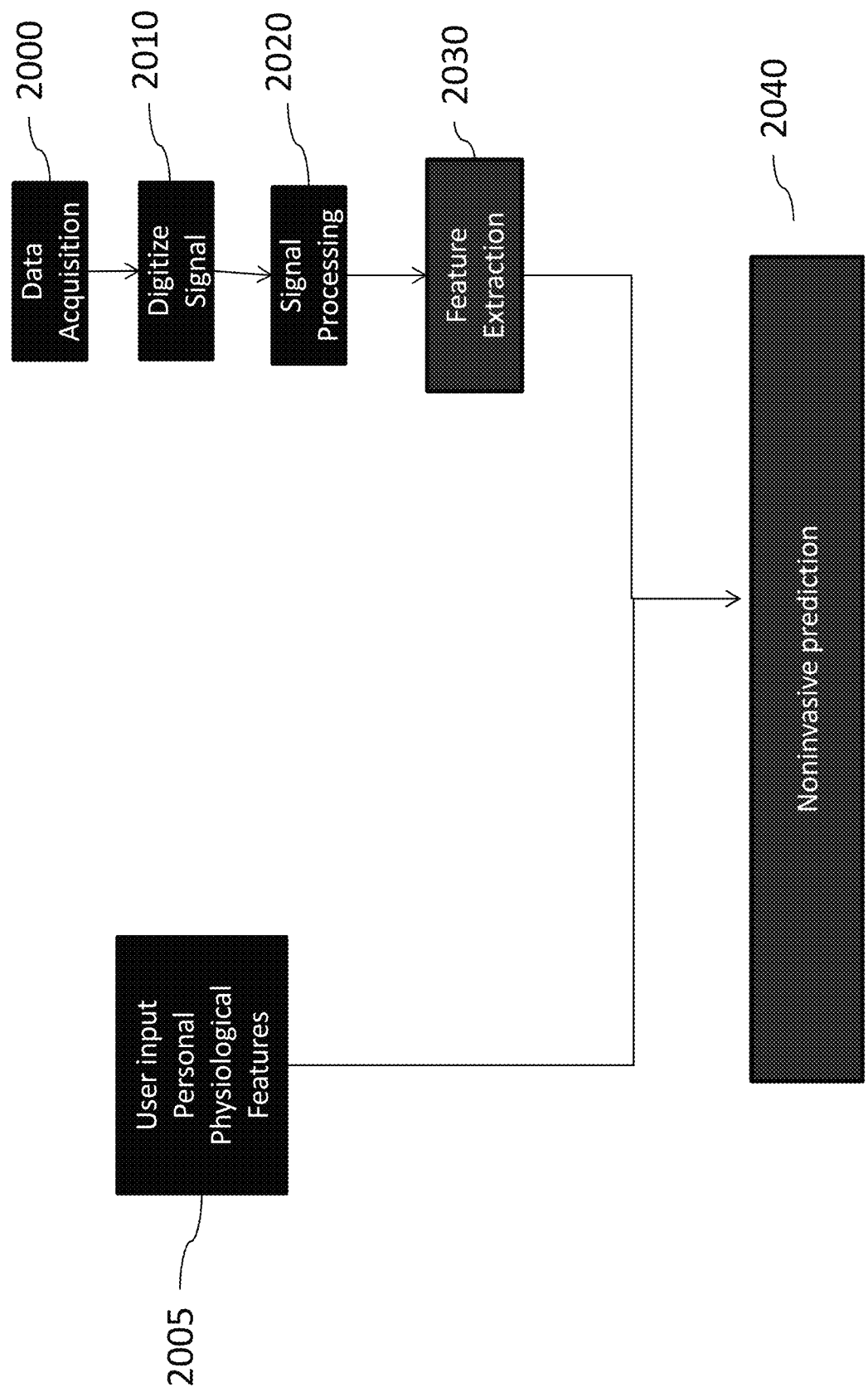
FIG. 7 illustrates an embodiment of the process flow of the prediction phase of the PPG based NIBG neural network prediction method of the present invention.
Figure 8B:
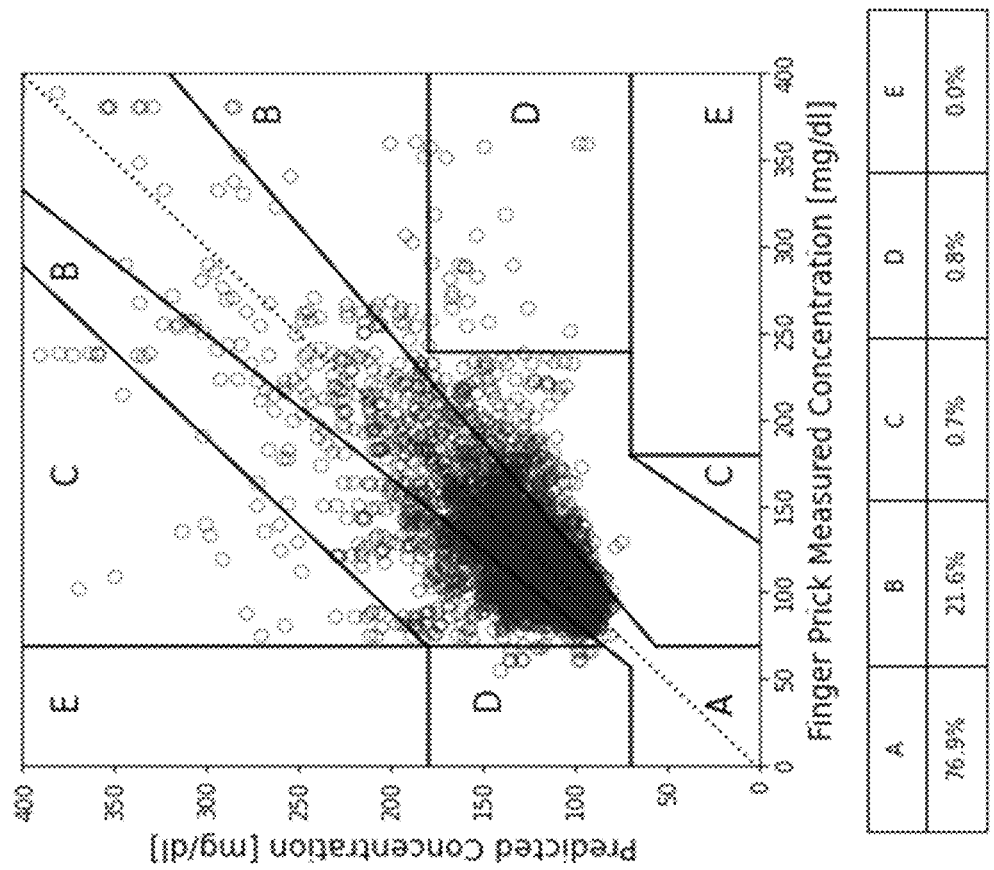
FIG. 8A-D depicts CEG analysis of various embodiments of the model of FIG. 3C of the present invention.
Figure 8A:
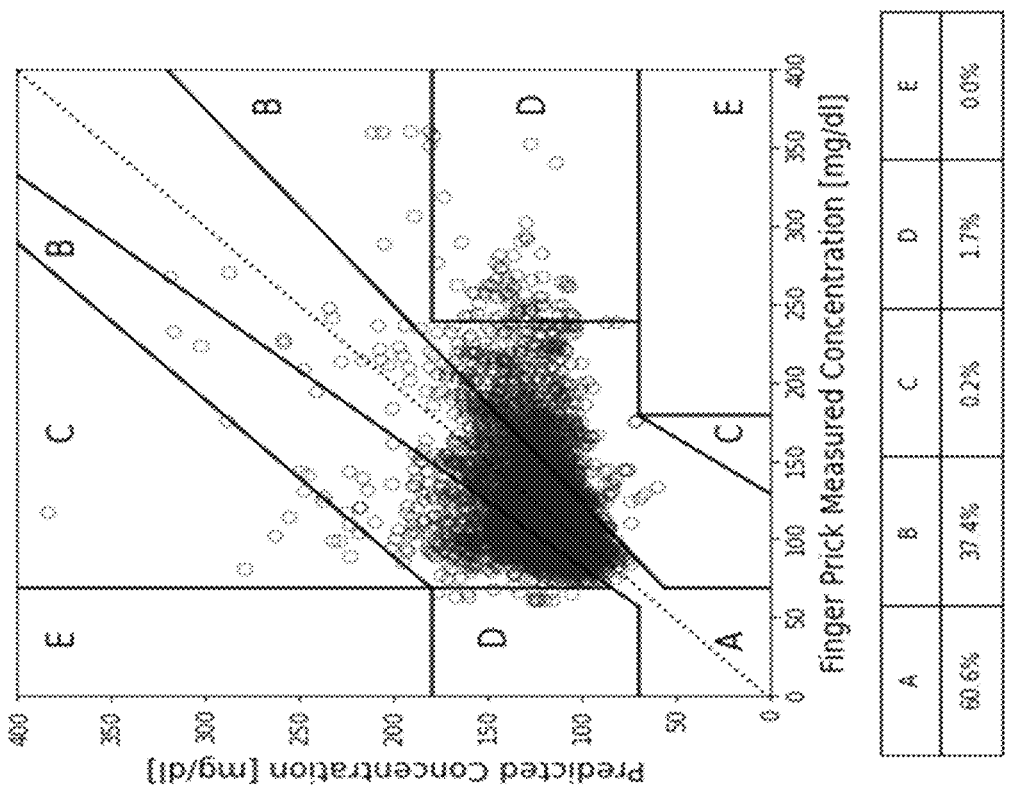
Figure 8D:
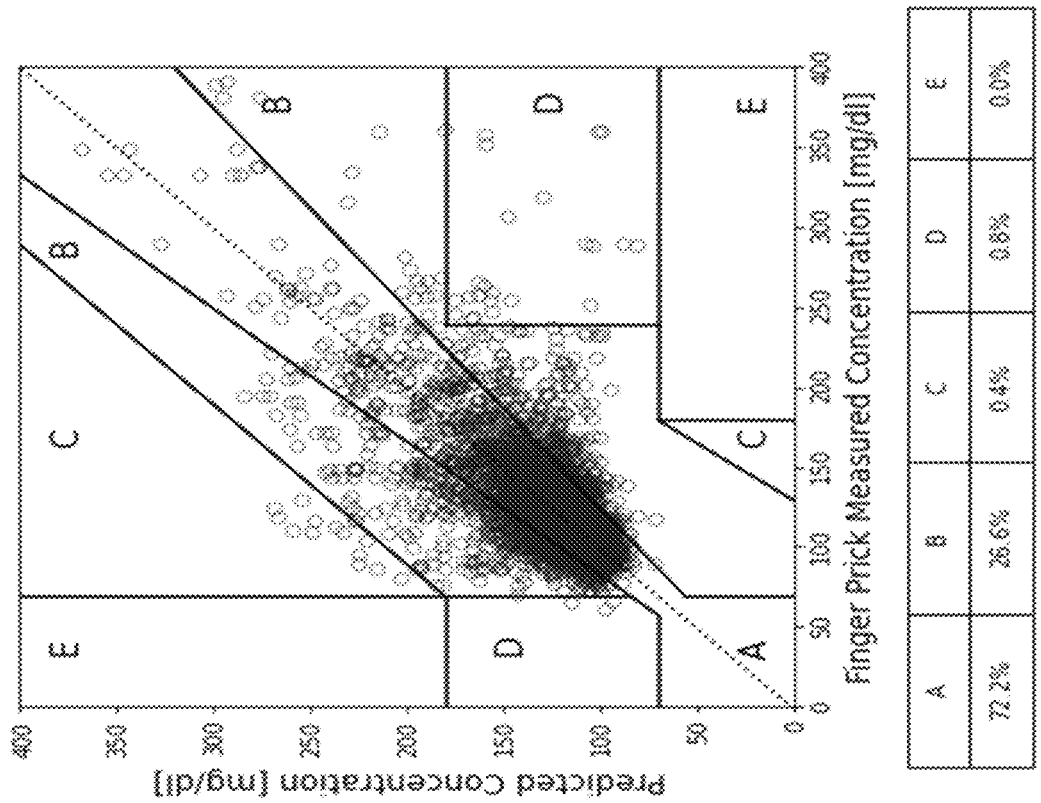
Figure 8C:
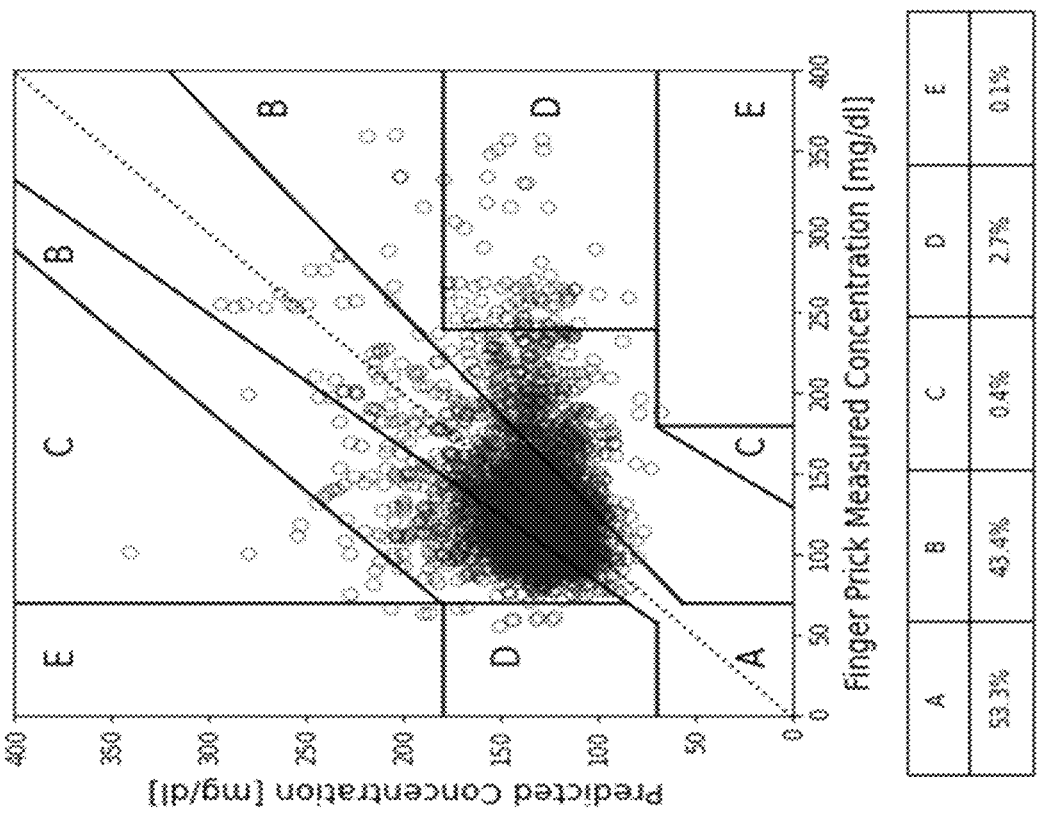
Figure 8F:
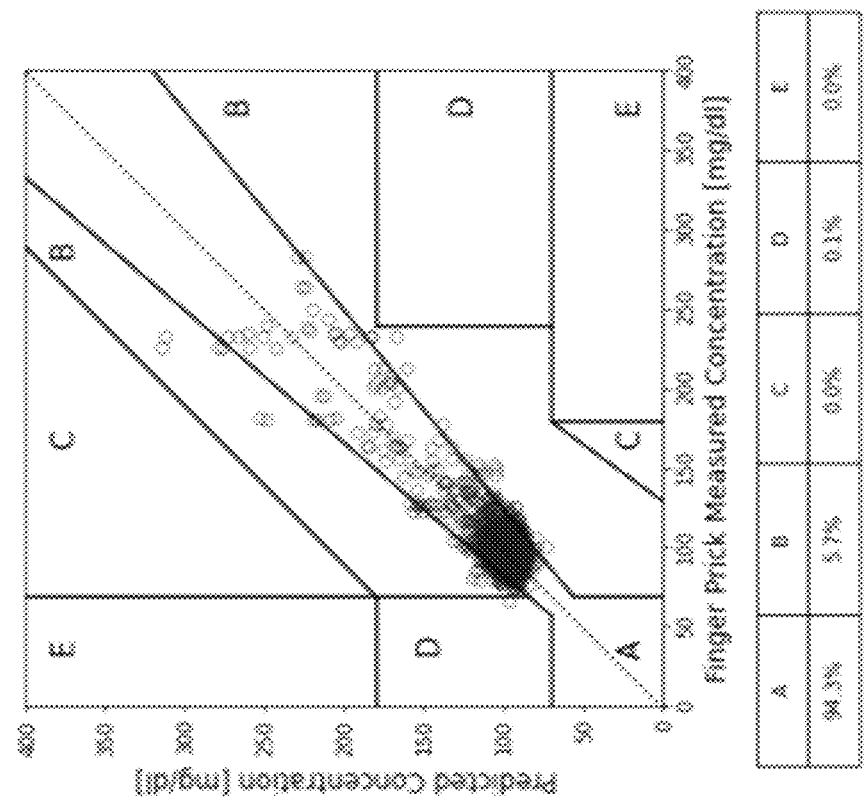
FIG. 8F depicts CEG analysis of the model of FIG. 3C with subjects and trained with training cohort undergoing medical treatment and with PPG signal, the 16 features and HbA1c included as input.
Figure 8E:
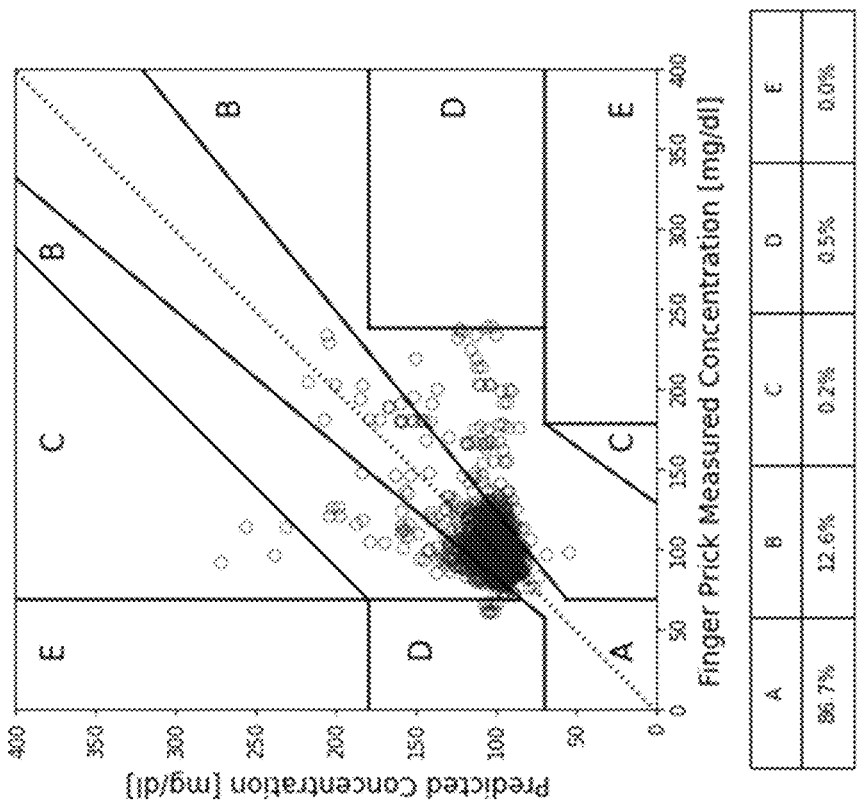
FIG. 8E depicts CEG analysis of the model of FIG. 3C with subjects and trained with training cohort not undergoing medical treatment and with PPG signal and feature but without HbA1c included as input.

In an embodiment, features may comprise personal physiological features, pulse morphological features, heart rate variance features or a combination thereof. In an embodiment, the pulse morphological features and heart rate variance features may also be termed extracted features 256 since these comprise features derived from the PPG signals. In an embodiment, the personal physiological features 251 may comprise age, waist circumference, body mass index, systolic, diastolic blood pressure or a combination thereof. In an embodiment, the pulse morphological features derived from the averaged PPG pulse may comprise the width of the pulse at 50% height, total pulse area of the minute, average pulse area, the median of the pulse area, or time difference from pulse valley to peak or a combination thereof. In an embodiment, the heart rate variance features derived from the PPG window may comprise both low-frequency power from Fast Fourier Transformation (FFT), high-frequency power from FFT, total power from FFT, percentage of pulse successive interval changes exceeding 20 ms, the standard deviation of successive interval changes or a combination thereof. In an embodiment, all 17 features listed above (plus HbA1c for models including it) is aggregated into a feature vector F 340 as input into the neural network of the present invention. In another embodiment, other features such as peak and dicrotic notch location, peak amplitude, peaks and valleys location on 1st and 2nd derivative of the signal waveform may also be included as features The present invention also provides a method for PPG based NIBG neural network prediction. FIGS. 6 and 7 illustrate the method of the present invention. As shown in FIGS. 6 and 7, the method of the present invention comprises training phase and prediction phase, respectively.

FIG. 6 illustrate the training phase of the method of the present invention. The training phase of the method of the present invention begins with obtaining a set of training data set from training cohort for training the neural network 230 of the present invention. This comprises step 1000 of acquiring PPG signals from a training cohort using signal device 110 as well as step 1005 of inputting each person of the training cohort's physiological features such as BMI, age, waist size, height, weight, etc. . . . In addition, step 1000 involves obtaining reference data. In one embodiment, the reference data set comprises HbA1c and blood glucose level obtained from each person of the training cohort using conventional finger pricking or drawing of blood method for purposes of input as well as for training the neural network 230 of the present invention.

In one embodiment, there are more than 100, 500 or 1000 persons in the training cohort. It is preferable that the training cohort comprises a diversity of people of various sexes, ages and physical conditions. In an embodiment, each person of the training cohort is not undergoing any medical treatment. In another embodiment, each person of the training cohort is not undergoing any medical treatment that can affect his or her cardiovascular system and/or not undergoing any medical treatment for diabetes.

If the PPG signals are collected in analogue format, the signals are digitized in step 1010 by A/D converter 220. The digitized signal 252 may be stored in database 250 as part of step 1010. Next, the digitized signal 252 is subjected to signal processing in step 1020 by the signal processor 222. In one embodiment, as mentioned above, the signal processing step 1020 may comprise decomposing the signal into high frequency part and low frequency part, such as separating its AC component from the DC component. In another embodiment, the signal processing step 1020 may comprise transforming the signal using transformation methods such as Fourier transformation, wavelet transformation, Hilbert-Huang transformation or any other transformation related to any time-frequency analysis. In an embodiment, the digitized signals are processed into signal windows which are digitized segments of the PPG signal as disclosed above. Results of the signal processing 1020 may be stored in memory 250 as part of step 1020.

Next, in step 1030, the feature extractor 224 extracts extracted features 256 from the digitized signal 252 and/or the processed signal 254 such as pulse morphological features comprising the width of the pulse at 50% height, total pulse area of the minute, average pulse area, the median of the pulse area, time difference from pulse valley to peak or a combination thereof as well as heart rate variance features comprising both low and high-frequency power from fast Fourier transformation (FFT), total power from FFT, percentage of pulse successive interval changes exceeding 20 ms, the standard deviation of successive interval changes or a combination thereof. The extracted features 256 may be stored in memory 250 as part of step 1030.

After extracting the extracted features 256, any embodiments of the PPG based NIBG prediction system disclosed may be trained in steps 1040 to estimate blood glucose level using the training data obtained and derived in prior steps. Training methods are known in the art such as discussed in the reference cited in footnote 1 which is incorporated in its entirety. In an embodiment, training should result in minimization of summation of loss between reference BG data and corresponding BG prediction for each person in the training cohort by modifying weights and biases within any embodiments of the neural network 230 of the PPG based NIBG prediction system of the present invention such as the filters, dense layers etc. . . .

After the training phase, the PPG based NIBG prediction system of the present invention is ready to predict BG level as illustrated in FIG. 7 for subjects not undergoing any medical treatments. After the training phase, the PPG based NIBG prediction system of the present invention may also be used to predict BG level as illustrated in FIG. 7 for subjects not undergoing any medical treatments that can affect the subject's cardiovascular system and/or subject not undergoing any medical treatments for diabetes. As shown in FIG. 7, the method for estimating blood glucose level comprises steps 2000 data acquisition, 2005 user input, 2010 digitize signal, signal processing 2020 and feature extraction 2030. These are the same steps as the training process steps 1000 data acquisition, 1005 user input, 1010 digitize signal, signal processing 1020 and feature extraction 1030 except that they are performed for one particular user, subject 100, who is interested in PPG based NIBG prediction. In step 2040, the trained model is used to perform NIBG prediction.

Examples

Materials and Methods

In this study, model of FIG. 3C using all the 2538 subjects were established as the baseline to stand for the conventional methods of using a single universal model on a large sample size. We then separated subjects into two cohorts based on whether they were under medical treatment of any sort (including insulin injections, cardiovascular treatments . . . etc). Medical treatment includes any medical procedures, drug or drug regimen regulated by the United States Food and Drug Administration and/or European Medicines Agency as a medical procedure, drug or drug regimen. The cohorts of subjects with and without medical treatment consist of 1682 and 856 subjects, respectively. The characteristics of each cohort are summarized in Table 1. The first set of models were constructed for each cohort to compare with the universal model. The second set of models were then constructed for each cohort with the addition of their HbA1c values as a new feature to assess the performance improvement. All five models use exactly the same CNN architecture illustrated in FIG. 3C for impartial comparison involving medical treatment and HbA1c. A visual representation of the idea of this study is presented in FIG. 5A.

TABLE 1

Characteristics for the participants of cohorts with and without medical treatment.

| Cohort | | BG (mg/dl, mean ± SD) | HbA1c (%, mean ± SD) | Age (years, mean ± SD) | BMI (kg/m$^2$) | W_cir* (cm, mean ± SD) |
|---|---|---|---|---|---|---|
| Total of 2538 Subjects | Subjects with Medical Treat. (1682 subjects) | 136.1 ± 43.6 | 7.3 ± 1.5 | 65 ± 9 | 25 ± 4.1 | 86.2 ± 10.2 |
| | Subjects w/o Medical Treat. (856 subjects) | 103.3 ± 22.0 | 5.9 ± 0.8 | 59 ± 10 | 23.6 ± 3.5 | 80.3 ± 9.6 |

*W_cir: waist circumference.

Furthermore, model of FIG. 3B with one convolution module rather than the two parallel convolution modules of the model of FIG. 3C was used to train as well as test BG prediction using data obtained from two sets of subjects and training cohorts determined by the criteria of with and without medical treatment. Four types of inputs were used including 1. PPG signal alone, 2. PPG signal plus 16 features listed as described in the Experimental Setup section as well as discussion in connection with feature vector 340, 3. PPG signal plus HbA1c and 4. PPG signal, HbA1c and the 16 features.

Moreover, fully connected neural network model of FIG. 3D was used to train as well as test BG prediction using data for two sets of subjects and training cohorts determined by the criteria of with and without medical treatment. Two types of input vectors were used including 1. 16 features listed as described in the Experimental. Setup section, 2. HbA1c and the 16 features.

Experimental Setup

The collection of samples in this study has been approved by the Institutional Review Board of Academia *Sinica*, Taiwan (Application No: AS-IRB01-16081). The samples were collected from a total of 2538 volunteered subjects. All subjects were fully informed and have consented to the collection of data and its uses. Two consecutive one-minute-long PPG signal segments were recorded for each subject with their physiological information such as age, body shape, blood pressure, HbA1c, and BG level. The detailed experimental setup and procedures can be found in [25].

Each minute-long PPG signal was first segmented into signal windows for extracting both morphological features and heart rate variance (HRV) features. Firstly, the valleys of the PPG waveform were identified using the Bigger-Fall-Side algorithm [26]. Then from each valley, a backwardly one-second-long segment (total of 250 data points) containing the pulse was extracted. Averaging over the pulses, it was used to represent the entire minute of the PPG signal for deep learning neural network.

The features used in this study can be categorized into at least 3 categories, namely personal physiological features, pulse morphological features and heart rate variance. The latter two categories can also be termed extracted features since these are features that may be extracted from the PPG signal. In an embodiment, the personal physiological features include age, waist circumference, body mass index, systolic and diastolic blood pressure. In an embodiment, the pulse morphological features taken from the averaged PPG pulse comprise the width of the pulse at 50% height, total pulse area of the minute, average pulse area, the median of the pulse area, and time difference from pulse valley to peak. In an embodiment, the heart rate variance related features extracted from signal window may comprise both low and high-frequency power from FFT, total power from FFT, percentage of pulse successive interval changes exceeding 20 ms, the standard deviation of successive interval changes. The total of 17 features listed above (plus HbA1c for models including it) is aggregated into a feature vector F for feeding into each model.

Model Architecture

Inspired by Google's LeNet Inception structure [27], the model architecture of the model of FIG. 3C used in this study comprises of two parallel training blocks (Micro training and Macro training blocks) with different kernel sizes (filter lengths) and followed by the merge block as shown in FIG. 3C. The idea of this design is in the hope to gather both macro and micro views of the input data. In each training block, the same averaged one-second-long segment is taken and trained independently. Both training blocks consist of three consecutive one-dimensional CNN (1dCNN) layers, each followed by batch normalization and maximum pooling [28]. The results of 1dCNN layers were then flattened and fed into 3 fully connected layers in each block. The outputs of both training blocks were then combined with features (feature vector F 340) before passing through the final merge block, consisting of three layers of fully connected neural network. Rectified Linear Units (ReLU) were used as activation functions throughout the model except the linear function was used at the final output layer. The schematic diagram of the model architecture is shown in FIG. 3C.

As second model used in this study is shown in FIG. 3B which is a simplified version of FIG. 3C. Specifically, model of FIG. 3B does not comprise a second parallel CNN module as model of FIG. 3C to demonstrate that high accuracy can also be achieved without the parallel CNN module structure when subjects and training cohort undergoing medical treatment are excluded and/or HbA1c data of the subject and training cohort is included in the input.

As third model used in this study is shown in FIG. 3D which is a fully connected neural network to demonstrate that a diversity of neural network models can benefit in terms of accuracy when subjects and training cohort undergoing medical treatment are excluded and/or HbA1c data of the subject and training cohort is included in the input.

Results

The universal model of not separating subjects and training cohorts by the criteria of with and without medical treatment nor not including HbA1c is established as a baseline to examine the effects of medical treatment and the inclusion of HbA1c on the other models. In this study, the following metrics were used to assess the performance of models: root mean squared error (RMSE), mean absolute error (MAE), mean absolute percentage error (MAPE), coefficient of determination ($R^2$), proportion within 10% variance (±10%), and Zone A to Zone E of Clarke's error grid (CEG) [29]. For each model, a total of 10 independent training and testing were conducted with randomly separated data into 9:1 of training and testing sets to properly check the learning consistency and also to avoid overfitting. The average performance of the 10 independent training of each model is summarized in Table 2 for model of FIG. 3C.

The average performance for model of FIG. 3B is summarized in Table 3, and the average performance for model of FIG. 3D is summarized in Table 4. The test BG prediction performance for the model of FIG. 3C are illustrated in CEG plots of FIG. 8A-F (with the accumulation of all testing from the 10 trainings) and summarized in Table 2, which offer a quick and intuitive way of interpreting the estimated BG level. The test BG prediction performance of model of FIG. 3B are illustrated in CEG plots of and FIGS. 10-13 and summarized in Table 3, and the test BG prediction performance of model of FIG. 3D are illustrated in CEG plots of and FIGS. 14-15 and summarized Table 4. In CEG plots, all the estimated results are classified into 5 zones (A to Z) based on how well the estimation affects clinical decision making, in which zone A is considered accurate, zone B is considered clinically acceptable (does not lead to negative impacts), and zones C, D, and E are considered dangerous due to significant clinical error in predictions.

TABLE 2

Summary of model performance of model of FIG. 3C

| Data set | Subject Count | CEG Zone A(%) | RMSE (mg/dl) | MAE (mg/dl) | MAPE (%) | $R^2$ | ±10% |
| --- | --- | --- | --- | --- | --- | --- | --- |
| All (No HbA1c) | 2538 | 60.65 | 36.76 | 25.45 | 19 | 0.06 | 0.33 |
| All (with HbA1c) | 2538 | 76.92 | 30.53 | 18.98 | 15 | 0.42 | 0.50 |
| w/Med. Treat. (No HbA1c) | 1685 | 53.32 | 44.48 | 31.96 | 23 | −0.09 | 0.28 |
| w/Med. Treat. (with HbA1c) | 1685 | 72.25 | 32.19 | 21.75 | 16 | 0.394 | 0.43 |
| w/o Med. Treat. (No HbA1c) | 856 | 86.66 | 19.71 | 11.86 | 11 | −0.05 | 0.6 |
| w/o Med. Treat (with HbA1c) | 856 | 94.29 | 12.42 | 8.97 | 8 | 0.71 | 0.67 |

TABLE 3

Summary of model performance of model of FIG. 3B.

| Medical Treatment | Input | RMSE (mg/dl) | MAE (mg/dl) | MAPE (%) | +−10% | CEG Zone A(%) |
| --- | --- | --- | --- | --- | --- | --- |
| No | Signal | 36.786653 | 18.530492 | 0.128963 | 0.622702 | 82.5 |
| No | Signal + 16 Features | 25.924408 | 14.021612 | 0.121262 | 0.605232 | 84.7 |
| No | Signal + HbA1c | 11.723471 | 8.042087 | 0.076875 | 0.71293 | 90.1 |
| No | Signal + 16 Features + HbA1c | 10.664223 | 8.498913 | 0.076875 | 0.644055 | 91.8 |
| Yes | Signal | 44.396939 | 32.342741 | 0.082585 | 0.28974 | 45.2 |
| Yes | Signal + 16 Features | 53.626808 | 33.967725 | 0.230422 | 0.316538 | 48.30 |
| Yes | Signal + HbA1c | 33.608466 | 22.052871 | 0.177723 | 0.446898 | 65.5 |
| Yes | Signal + HbA1c + 16 Features | 33.932510 | 21.789288 | 0.189286 | 0.481204 | 62.00 |

TABLE 4

Summary of model performance of model of FIG. 3D.

| Medical Treatment | Input | RMSE (mg/dl) | MAE (mg/dl) | MAPE (%) | +−10% | CEG Zone A(%) |
|---|---|---|---|---|---|---|
| No | Fully Connected Neural Network 16 Features | 18.113388 | 11.183518 | 0.101482 | 0.644841 | 80.7 |
| No | Fully Connected Neural Network 16 Features + HbA1c | 12.059728 | 9.096906 | 0.087338 | 0.635072 | 82.900000 |
| Yes | Fully Connected Neural Network 16 Features | 47.096960 | 33.732651 | 0.246346 | 0.289391 | 49.600000 |
| Yes | Fully Connected Neural Network 16 Features + HbA1c | 40.131723 | 25.076206 | 0.174418 | 0.422710 | 61.100000 |

By separating subjects and training cohorts based on whether they are under any medical treatment, we can see the performance increased on the subject and training cohort without medical treatment for all models FIG. 3C, FIG. 3B and FIG. 3D. On the contrary, the performance had gotten worse for subjects and training cohort undergoing medical treatment for models of FIG. 3C, FIG. 3B and FIG. 3D. For model of FIG. 3C, comparing to the baseline, the cohort of subjects with medical treatment while excluding HbA1c has predictions approximately 7% less amount in Zone A of CEG; while for the cohort of subjects without medical treatment nor HbA1c, it is significantly improved by around 26%. Similar behavior was found across all the other performance metrics for both cohorts. As one may argue that the poor performance on the model of the cohort with medical treatment may be the result of unbalanced data that is skewed toward higher BG level. However, it is not the case since MAPE, which is a measure of prediction deviation in normalized BG level, is approximately 12% higher for the cohort with medical treatment than the cohort without medical treatment. This evidence indicates that the performance of the universal model is lowered by the subjects with medical treatment, which confirms our suspicion that medical treatment indeed has a negative effect on the model performance. Similar trends are also seen for model of FIG. 3B and FIG. 3D. Therefore, since exclusion of subjects and training cohort based on whether the subjects and training cohort are undergoing medical treatment substantially benefit a diversity of neural network models in terms of BG prediction accuracy, such exclusion should benefit all neural networks in prediction of BG.

Furthermore, with the inclusion of HbA1c, each case has gained a significant improvement in their overall performance for all models FIG. 3C, FIG. 3B and FIG. 3D. For model of FIG. 3C, the prediction accuracy of the model with HbA1c on the cohort with medical treatment improves from 53.32% to 72.25% of predictions in zone A of CEG. Interestingly, although improved by adding HbA1c, the baseline universal model only gained 16% improvement, up to about 77% of predictions in zone A of CEG; while the cohort with medical treatment just barely outperforms the baseline universal model without HbA1c. Both are still undesirable in practical application. On the other hand, the performance of the model with HbA1c on the cohort without medical treatment achieves 94% of predictions in zone A of CEG, and had no prediction falls into zones C, D, and E on testing sets.

Accuracy improvement is also seen with the inclusion of HbA1c in the input with the simplified model of FIGS. 3B and 3D as shown in Tables 3 and 4. Therefore, since inclusion of HbA1c as part of input benefit a diversity of neural network models in terms of BG prediction accuracy, the inclusion of HbA1c should benefit all neural networks in prediction of BG.

TABLE 5

The average training and testing loss of each model of FIG. 3C

|  | Training loss | Testing loss | Difference (Test − Train) |
|---|---|---|---|
| All (No HbA1c) | 884 | 1534 | 650 |
| All (with HbA1c) | 442 | 950 | 508 |
| with med. treat. (No HbA1c) | 292 | 2176 | 1884 |
| with med. treat. (with HbA1c) | 130 | 1052 | 922 |
| w/o med. treat. (No HbA1c) | 57 | 485 | 428 |
| w/o med. treat. (with HbA1c) | 75 | 165 | 90 |

In Table 5, we list the average training and testing loss of the 10 trainings for each case based on model of FIG. 3C. From the difference between the training and test loss, we can quantify and objectively see the discrepancy between training and testing. In an ideal situation, one would like to minimize the loss during training and have the testing loss be as close to the training loss as possible. That would make sure that the model actually learned the pattern of data and led to accurate predictions for the testing set. The learning curves of our models are presented in FIGS. 9A-F.

Figure 9A:
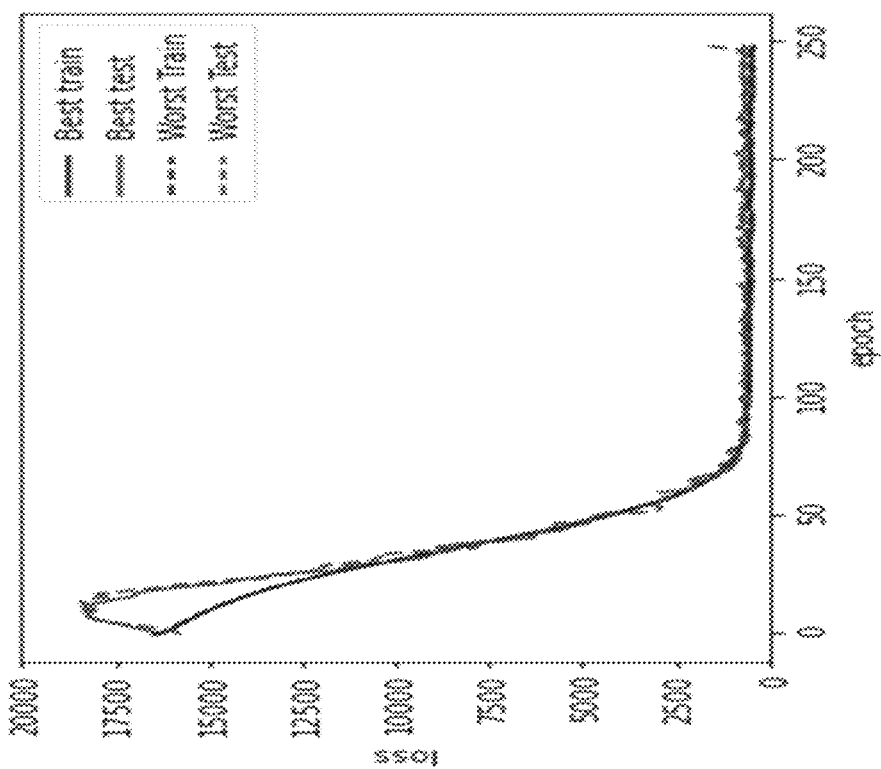
FIG. 9A-F depict learning curves for the various embodiments of the model of FIG. 3C of the present invention.
Figure 9B:
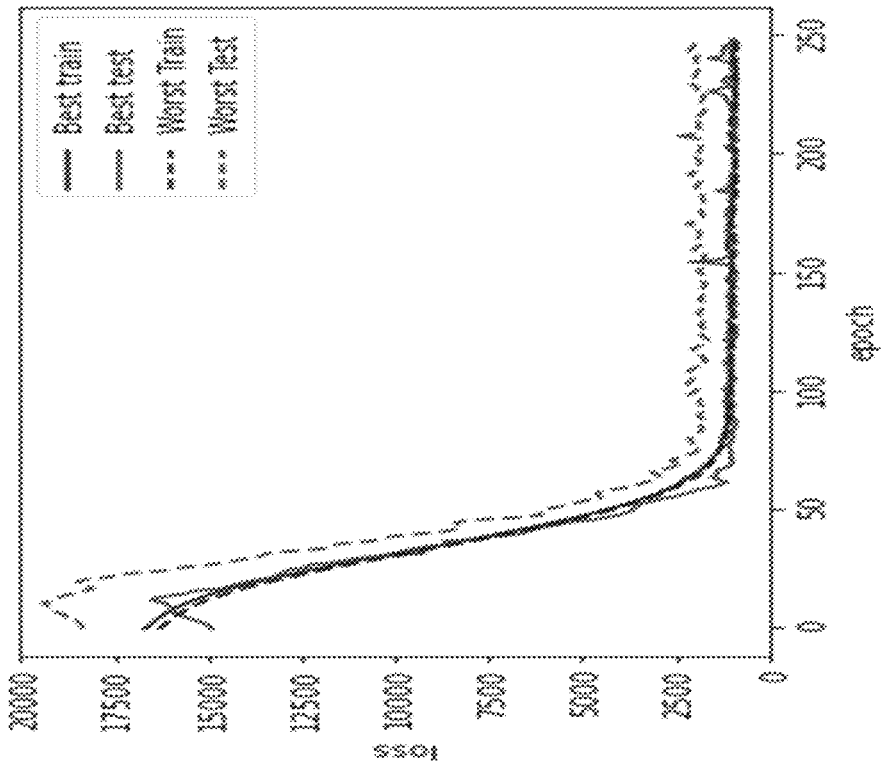
Figure 9D:
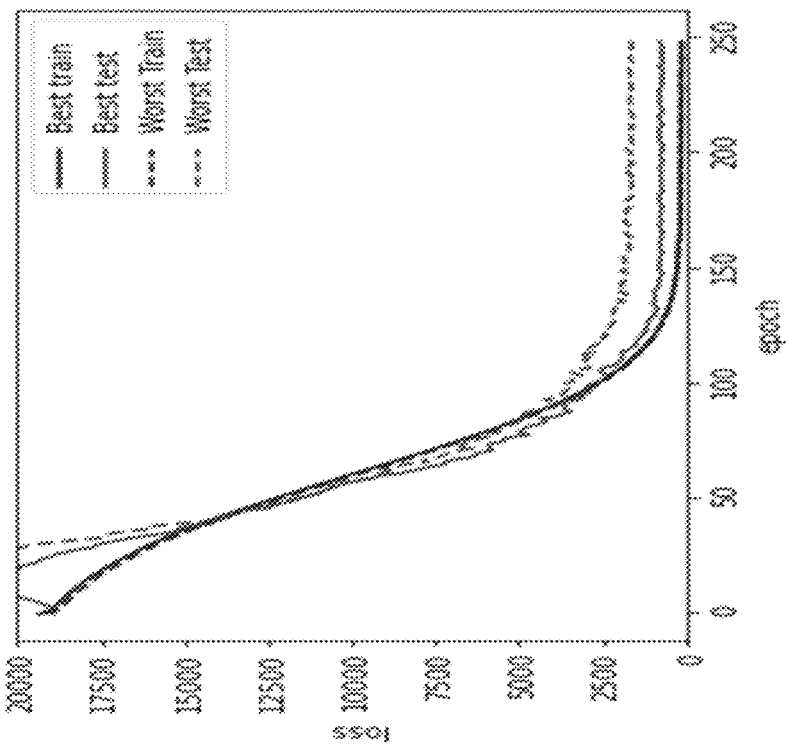
Figure 9C:
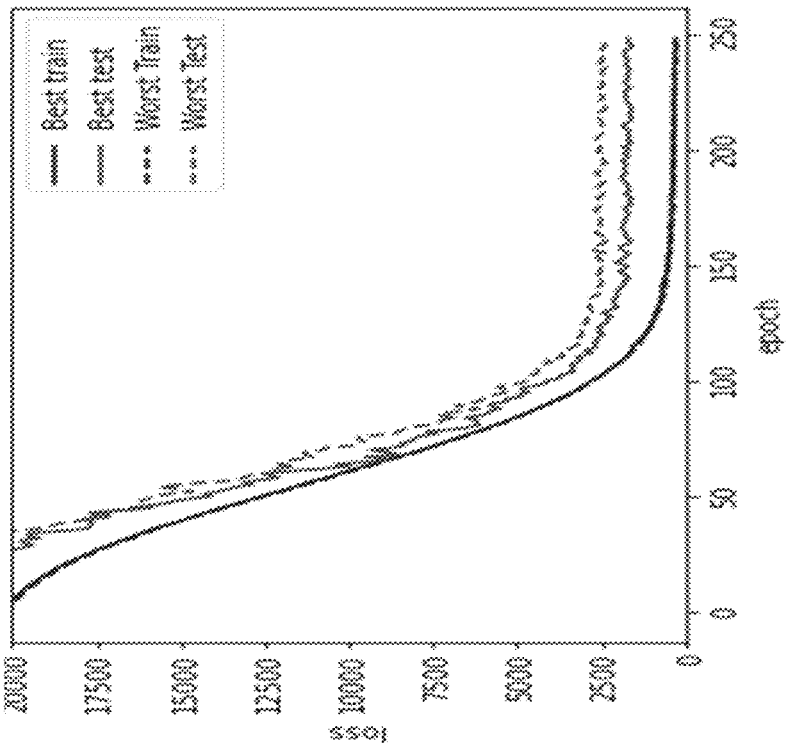
Figure 9F:
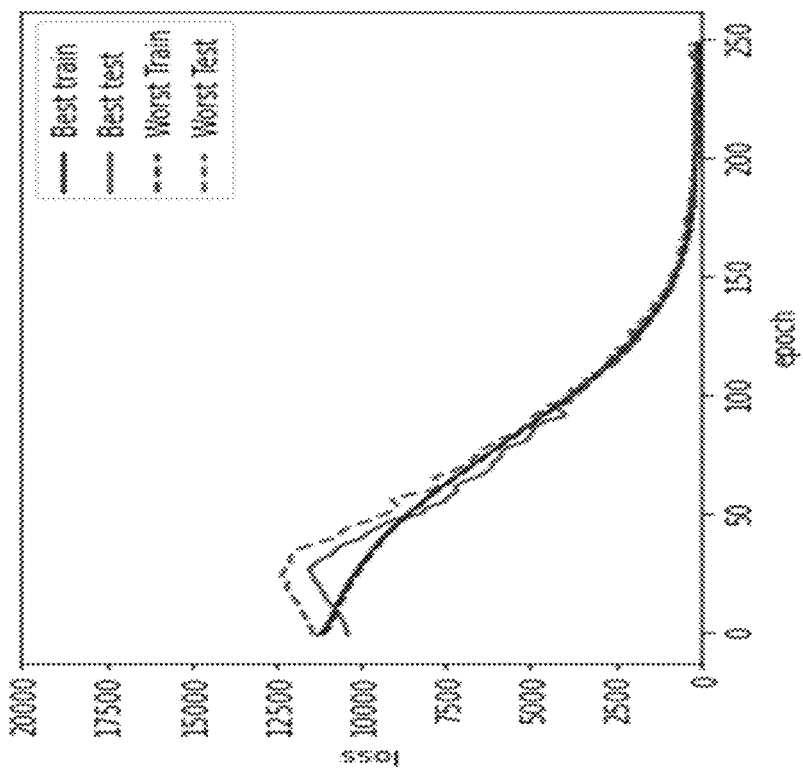
Figure 9E:
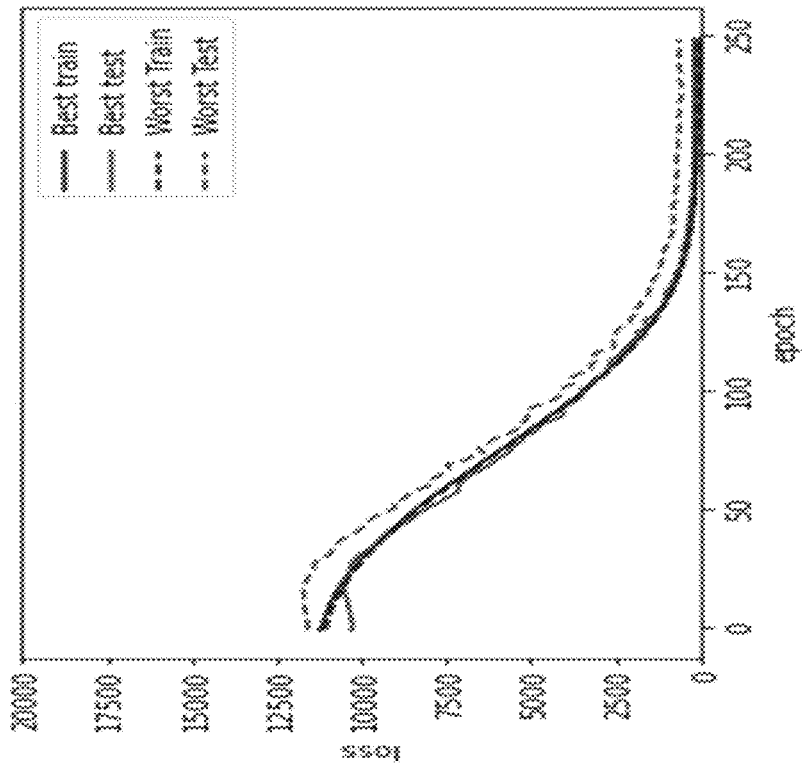
Figures 10A, 10B:
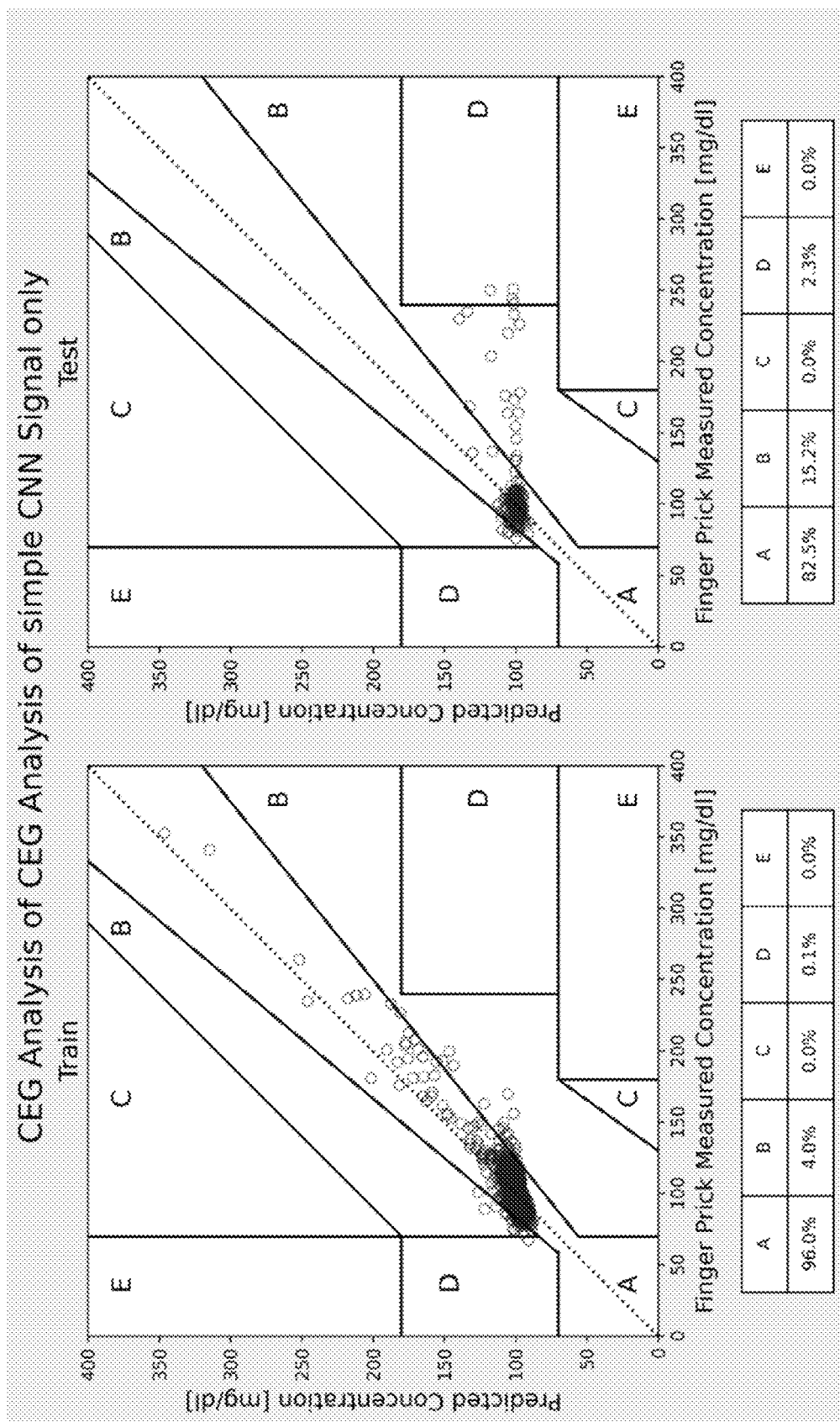
FIGS. 10A and 10B depict CEG analysis of the model of FIG. 3B of the present invention with only PPG signal and without HbA1c or the 16 features included as part of the input and with subjects and training cohort not undergoing any medical treatments.
Figures 10C, 10D:
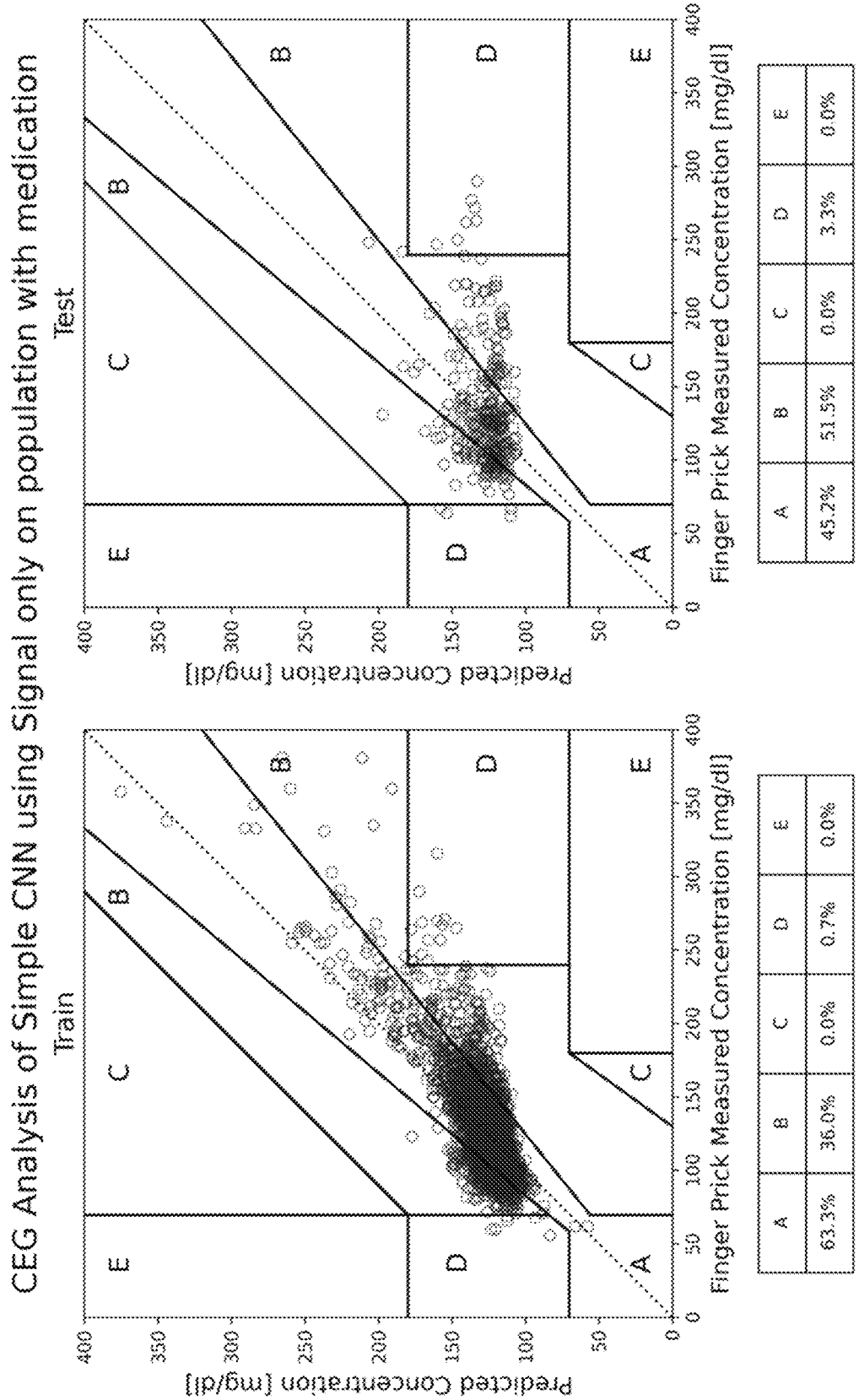
FIGS. 10C and 10D depict CEG analysis of the model of FIG. 3B of the present invention with only PPG signal and without HbA1c or the 16 features included as part of the input and with subjects and trained with training cohort undergoing medical treatments.
Figures 11A, 11B:
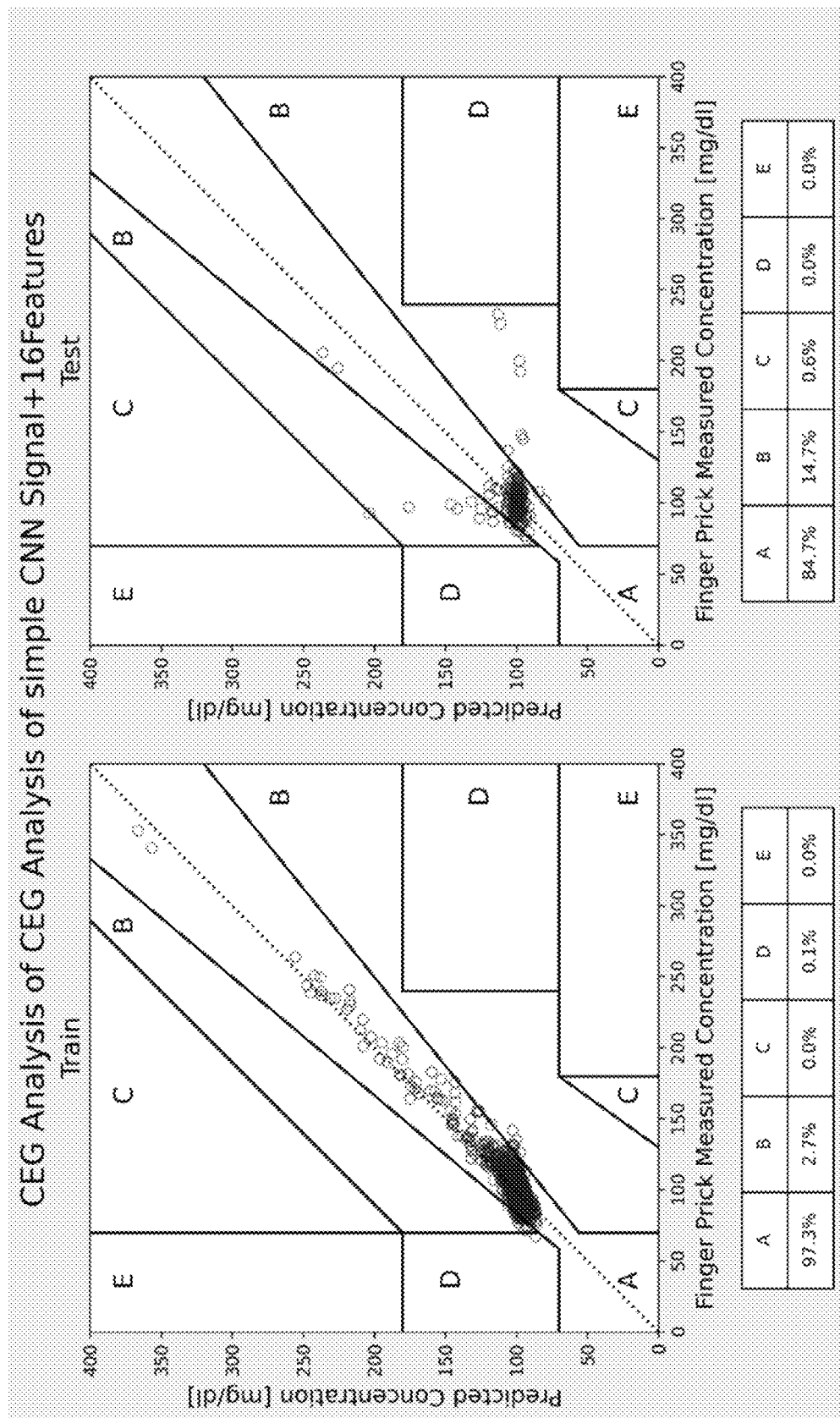
FIGS. 11A and 11B depicts CEG analysis of the model of FIG. 3B of the present invention with PPG signal and the 16 features but without HbA1c and with subjects and training cohort not undergoing any medical treatments.
Figures 11C, 11D:
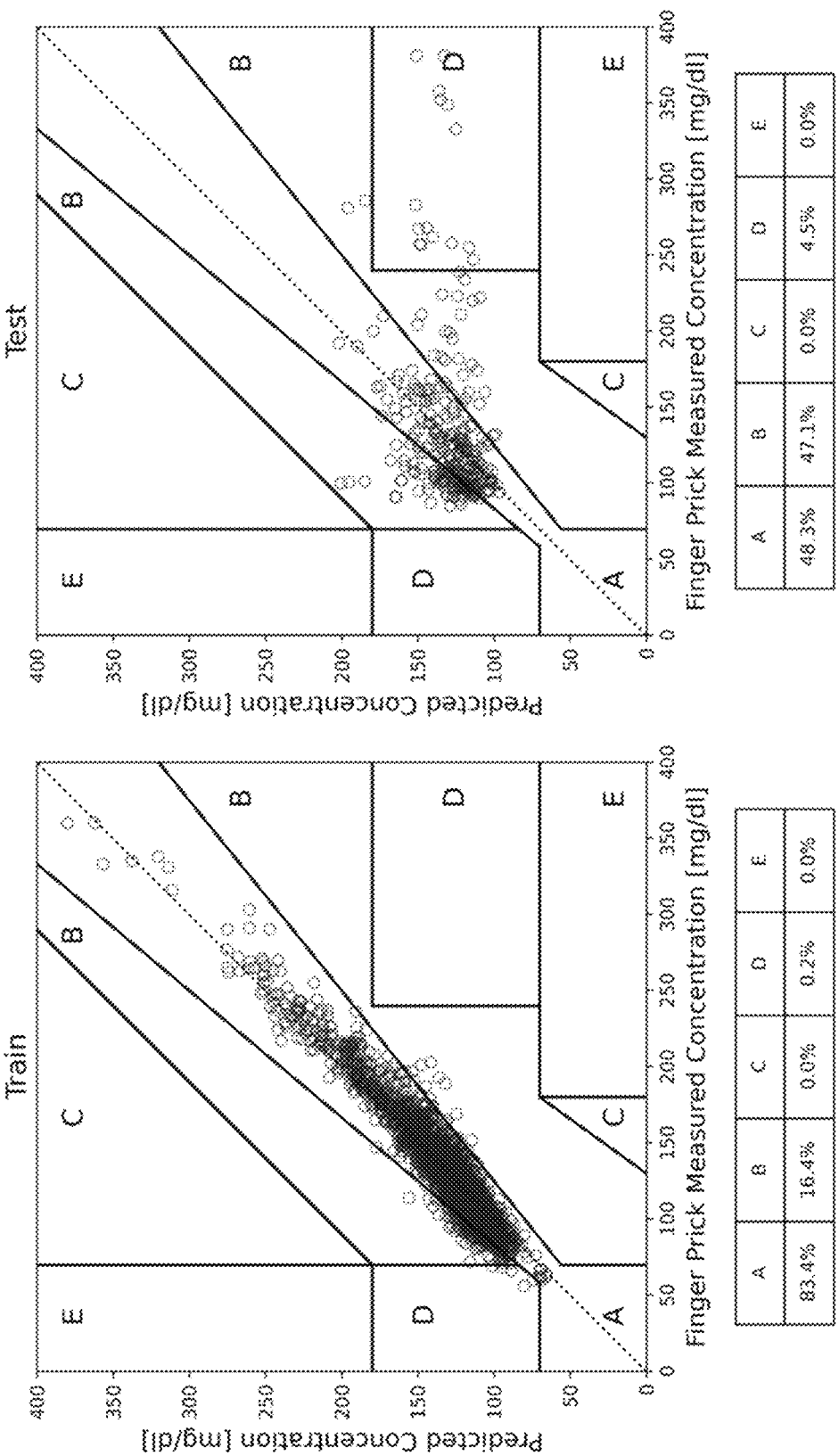
FIGS. 11C and 11D depict CEG analysis of the model of FIG. 3B of the present invention with PPG signal and the 16 features but without HbA1c and with subjects and training cohort undergoing medical treatments.
Figures 12A, 12B:
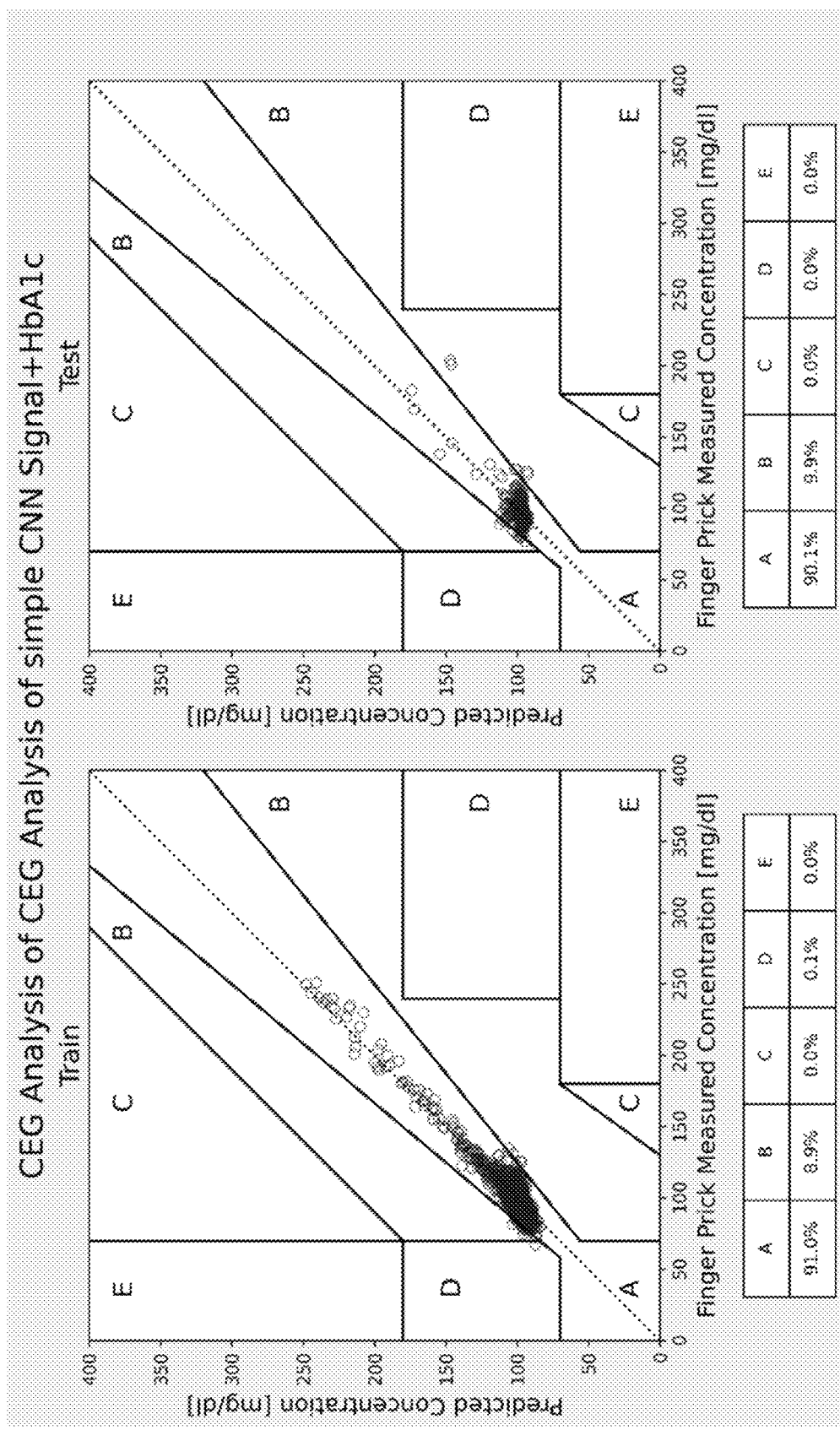
FIGS. 12A and 12B depict CEG analysis of the model of FIG. 3B of the present invention with PPG signal and HbA1c as input but without the 16 features and with subjects and training cohort not undergoing any medical treatments.
Figures 12C, 12D:
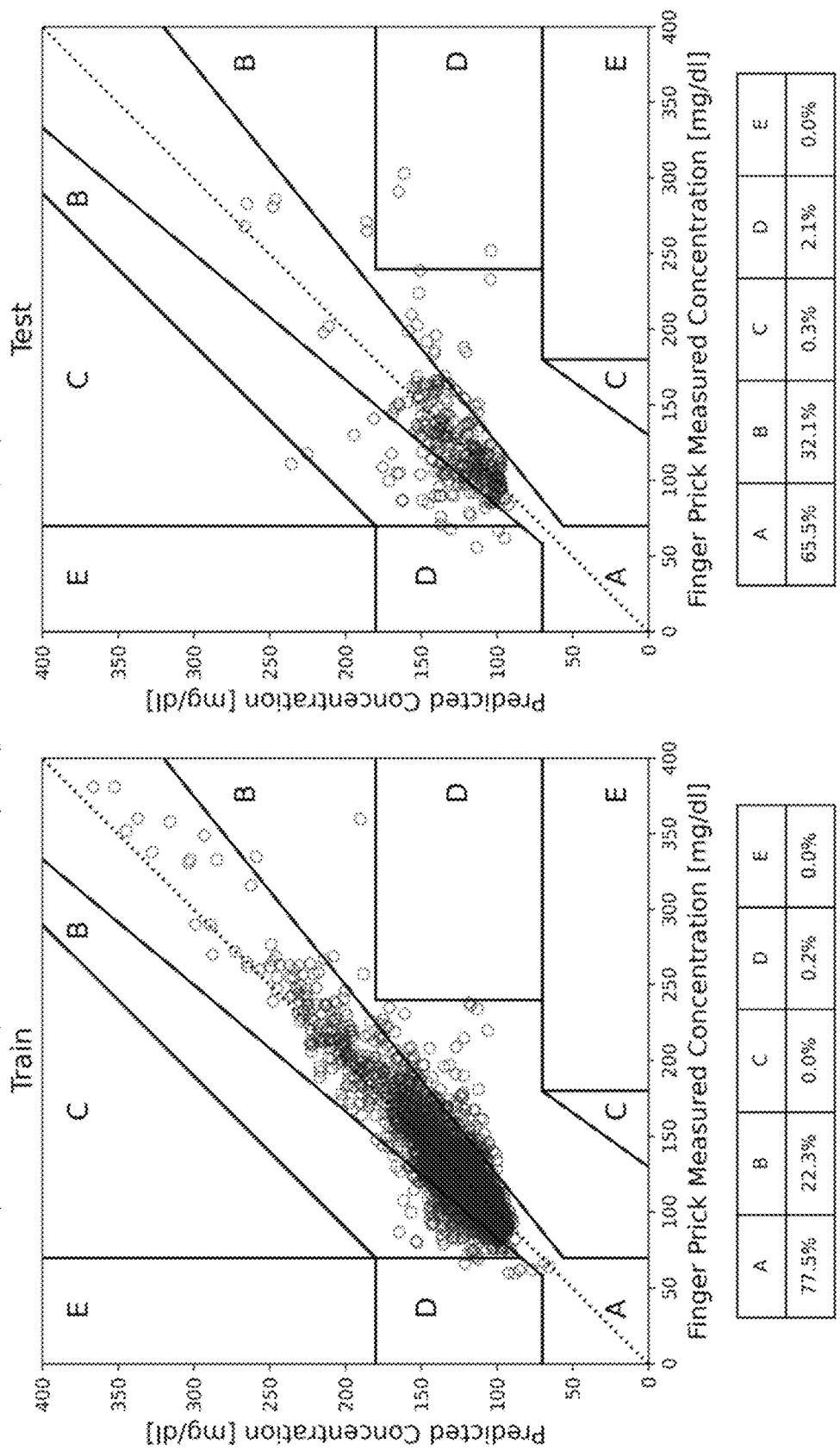
FIGS. 12C and 12D depict CEG analysis of the model of FIG. 3B of the present invention with PPG signal and HbA1c as input but without the 16 features and with subjects and training cohort undergoing medical treatments.
Figures 13A, 13B:
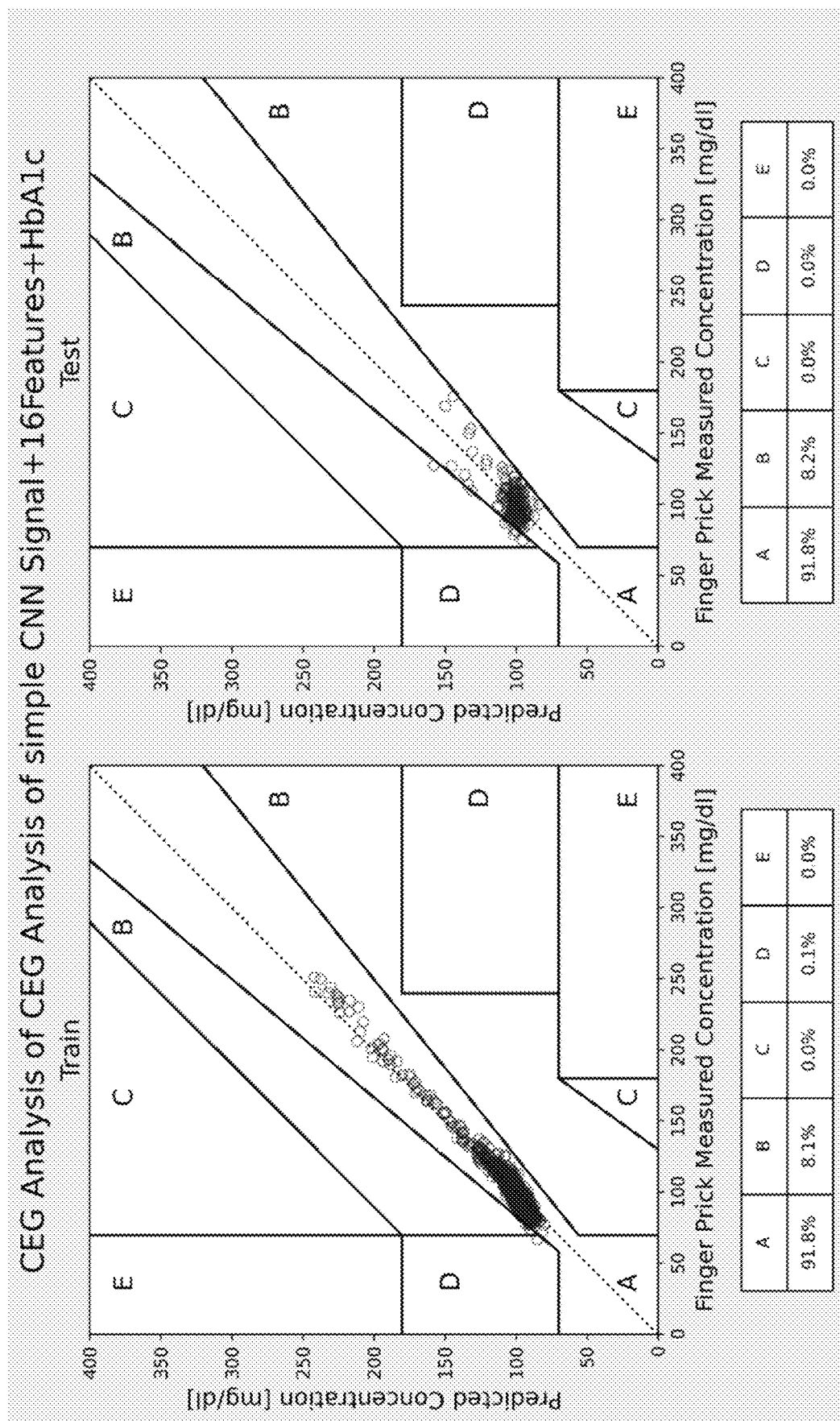
FIGS. 13A and 13B depicts CEG analysis of the model of FIG. 3B of the present invention with PPG signal, the 16 features and HbA1c as input and with subjects and training cohort not undergoing any medical treatments.
Figures 13C, 13D:
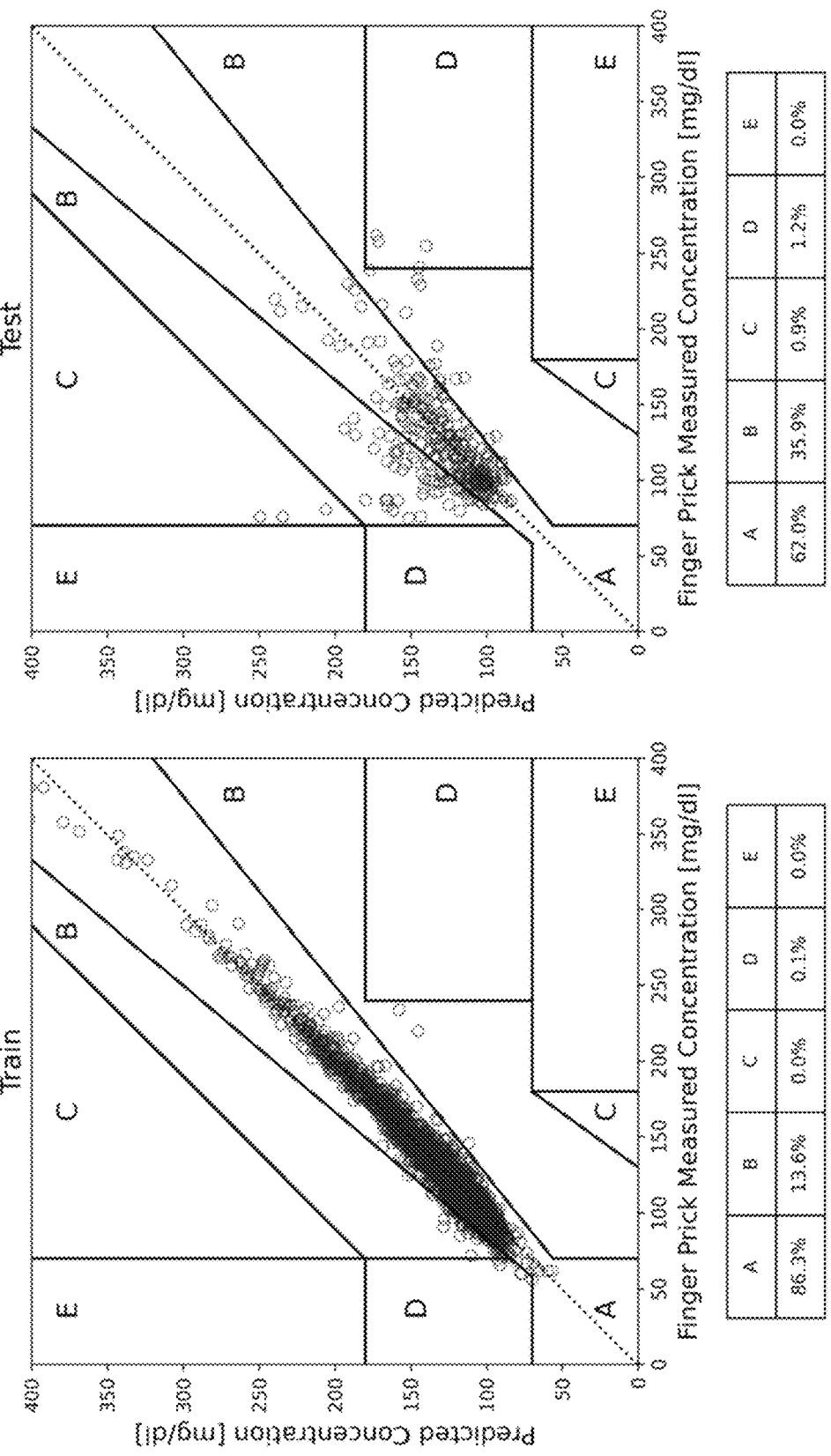
FIGS. 13C and 13D depict CEG analysis of the model of FIG. 3B of the present invention with PPG signal, the 16 features and HbA1c as input and with subjects and training cohort undergoing medical treatments.
Figures 14A, 14B:
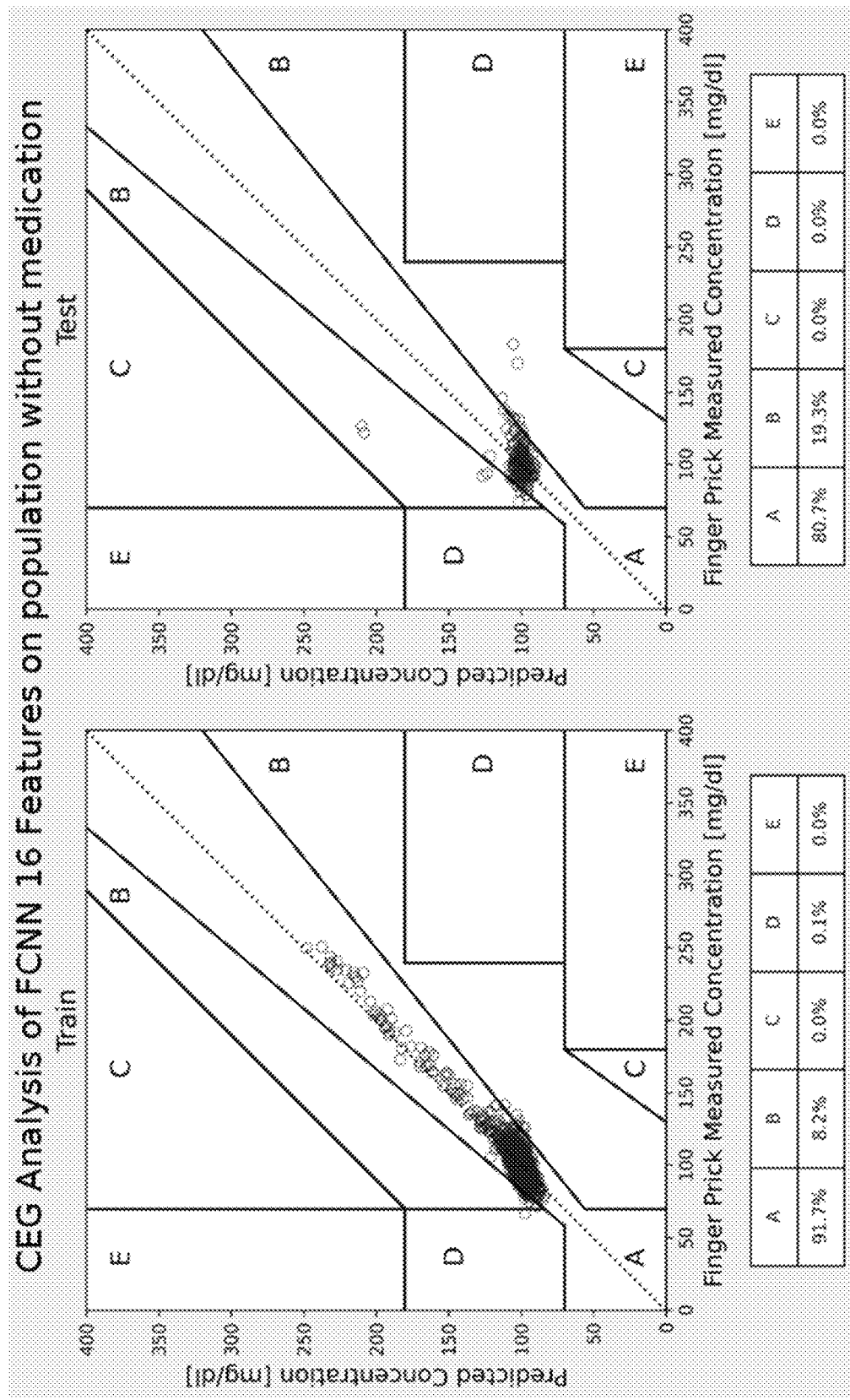
FIGS. 14A and 14B depict CEG analysis of the model of FIG. 3D of the present invention with PPG signal and the 16 features as input but without HbA1C and with subjects and training cohort not undergoing any medical treatments.
Figures 14C, 14D:
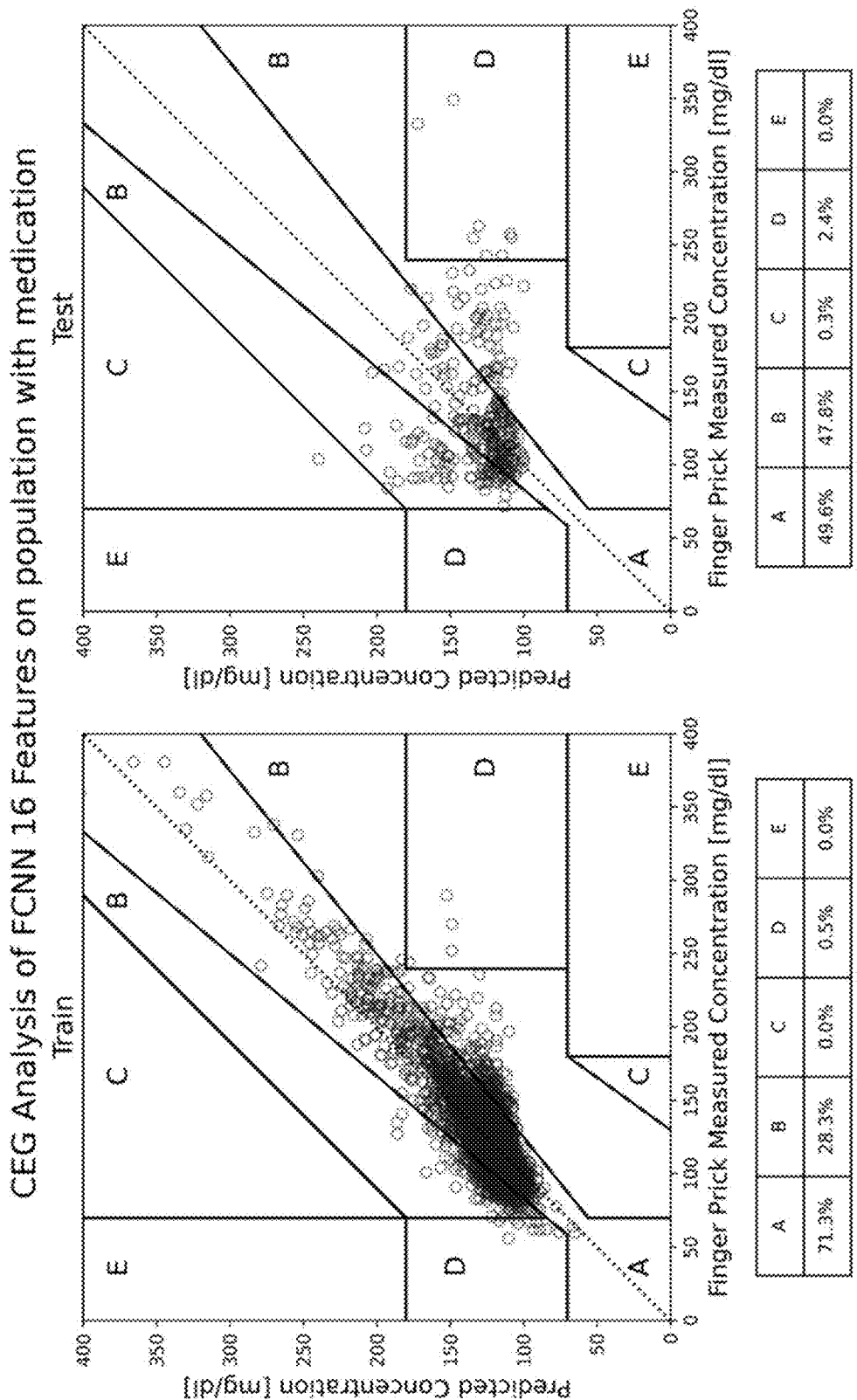
FIGS. 14C and 14D depict CEG analysis of the model of FIG. 3D of the present invention with PPG signal and the 16 features as input but without HbA1C and with subjects and training cohort undergoing medical treatments.
Figures 15A, 15B:
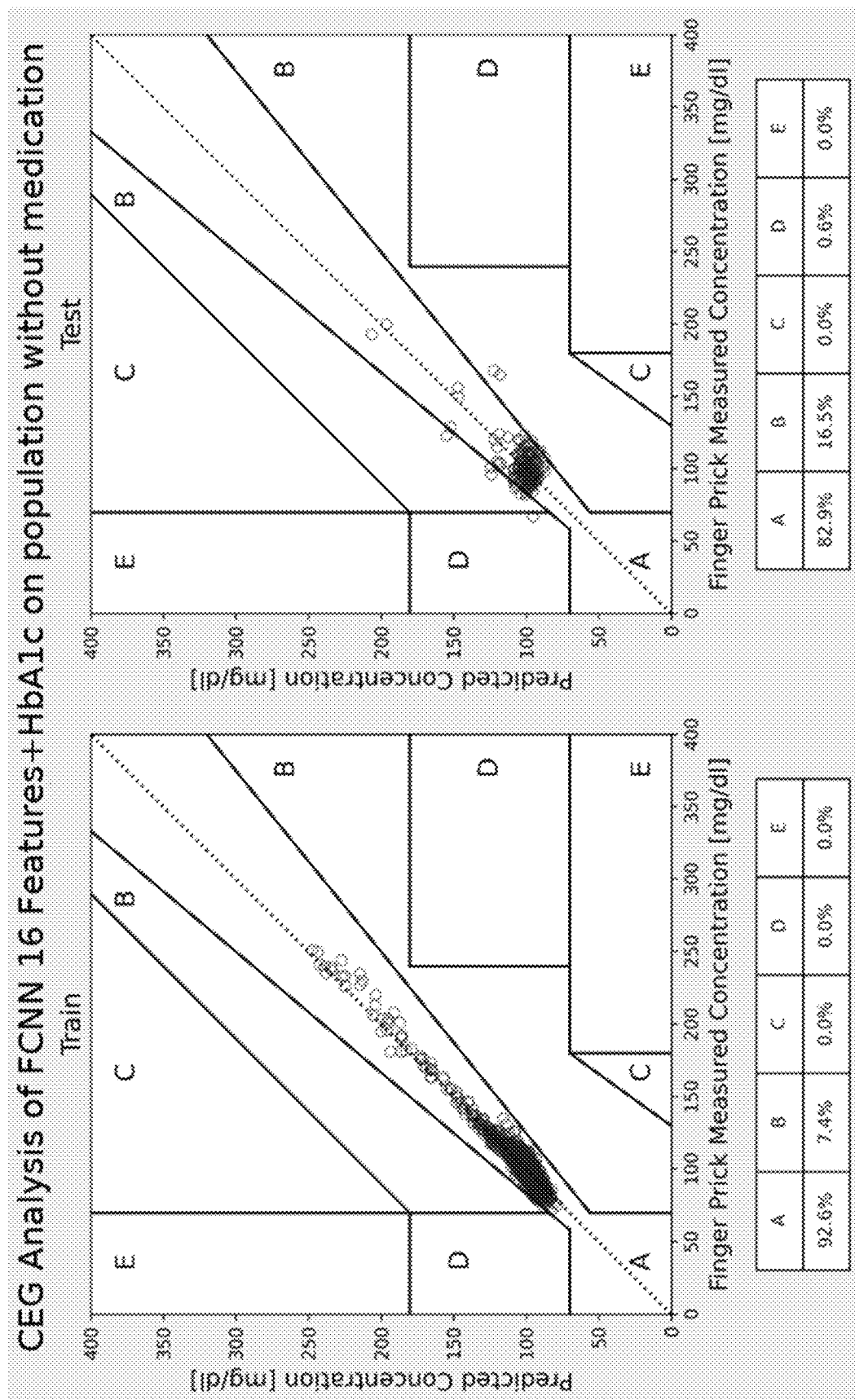
FIGS. 15A and 15B depict CEG analysis of the model of FIG. 3D of the present invention with PPG signal, the 16 features and HbA1c as input and with subjects and training cohort not undergoing any medical treatments.
Figures 15C, 15D:
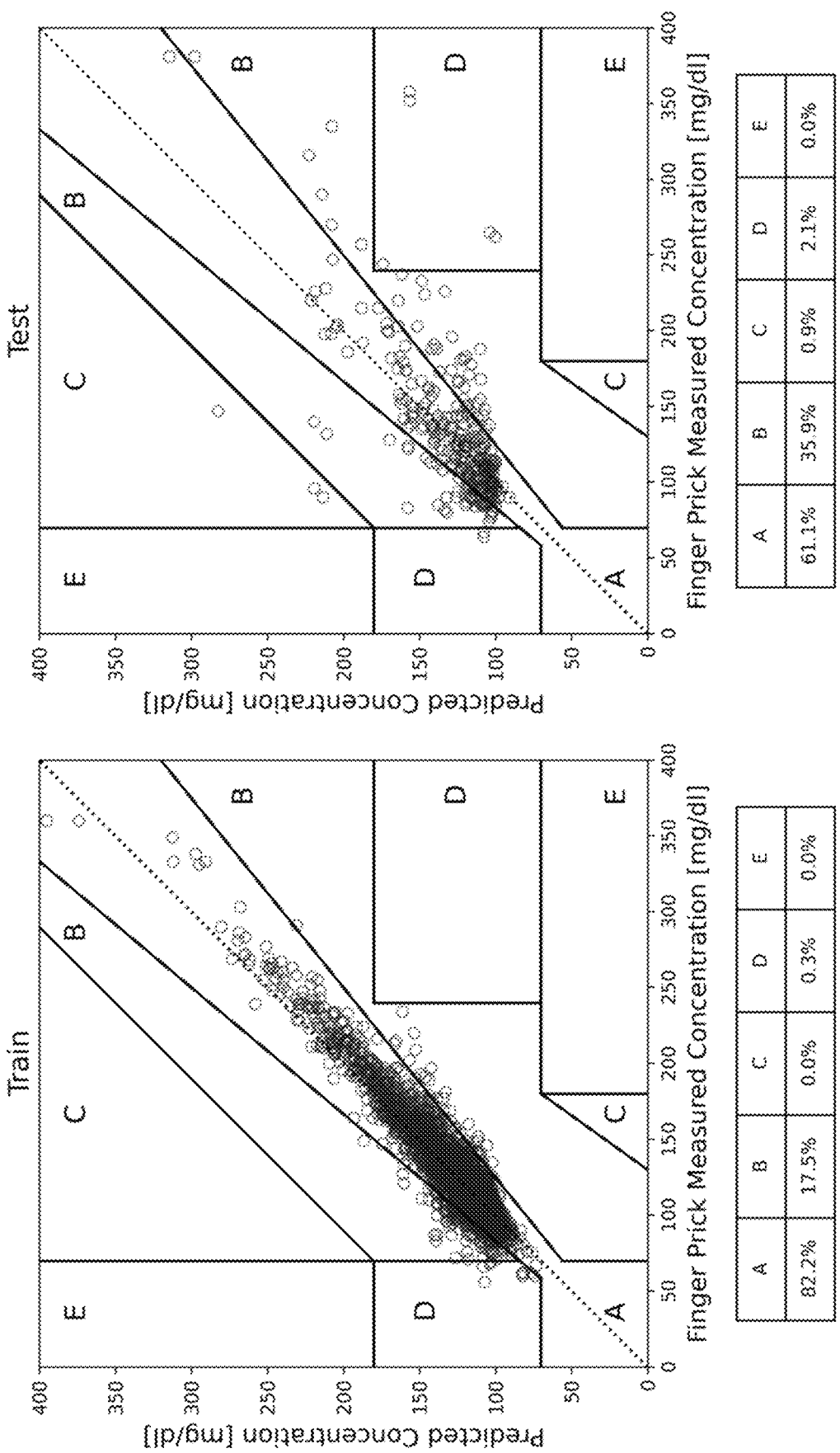
FIGS. 15C and 15D depict CEG analysis of the model of FIG. 3D of the present invention with PPG signal, the 16 features and HbA1c as input and with subjects and training cohort undergoing medical treatments.

For the universal model with all subjects included, the loss on both training and testing are large. As shown in FIG. 9A, that the learning curve flattens out after 75 epochs, the shortest one among all the cases. This suggests that compared to the other cases, there is conflicting information between the ground truth and the data patterns that forbids further convergence during learning.

From the discrepancy summarized in Table 5, the cohort of subjects with medical treatment has significantly larger differences between their training and testing loss. From the learning curve (FIG. 9B and FIG. 9C), although the loss converged much better during training, but the resulting models cannot reproduce good predictions. In addition, the curves of testing loss are flattened after 125 epochs without bending up, which suggests that there is no overfitting. As a result, it is clear that the model is unable to learn properly for accurate estimations. There is some key information missing for the cohort with medical treatment for further in-depth analysis.

On the contrary, the cohort of subjects without medical treatment has very minor differences between their training and testing loss, especially with the inclusion of HbA1c. This further suggests that the key piece on improving the prediction performance relies on mitigating the influence of medical treatment.

DISCUSSION

PPG morphological features extracted from the CNN architecture helps to explain the dynamic glucose variance among the samples. However, the PPG waveform variation may also be influenced by a lot of factors, such as the finger temperature, the probe contact, the blood pressure, etc. A key step to improve NIBG modeling is to find a basis for the model to distinguish the static part of glucose-related features. In this work, we take two factors into account, the medical treatment and the HbA1c level.

The result shows that excluding the medication-treated samples and including HbA1c as a feature improves the prediction performance. The worse result of subjects under treatment implies that when there is medical treatment involved, the problem became more complicated. As glucose homeostasis of a human body that controls the metabolism stability, external drug treatment may alter the body physiopathology, which in turn leads to confounded biological signal presentation, making the physiological status unpredictable. Even more, various kinds of medical treatment and different dosages of drugs all result in complex effects. Here we propose two possible solutions on mitigating the effects of varying medical treatment between subjects. 1) Properly clarify the effects of treatments on our investigating target, the PPG signal representation to BG level prediction, and incorporate them into model building. This study requires a more comprehensive data on the medical treatment routine for each subject and in-depth knowledge of the biological influence of these treatments. 2) Design personalized model for each subject. A personalized model essentially detours all the interpersonal differences, no matter whether medical treatment is applied, and more specifically targets the physiological evolution of oneself. This study requires the long-term collection of personal data but could be a viable way in future investment.

HbA1c plays an important role in improving our models. HbA1c has been regarded as readily to measure and is an important homeostasis index representing a long-term body glucose balance HbA1c also reflects a portion of glucose persistent in the blood-stream that may have a certain influence on near-infrared light absorption. Practically, people only need to measure their HbA1c once every three months, which is a significant advancement for people needing regular BG level monitoring. Therefore, it is feasible to adopt HbA1c to our NIBG modeling.

One limitation in this study would be the data imbalance issue. When separating the subjects into cohorts of with and without medical treatment, this issue may become severe for few high-glucose data jumbled, which may lead to significant outliers in prediction. This might not be easily resolvable since it depends on the recruited subjects available in our study. In order to prevent biased prediction due to unbalanced data, data reweighting or data augmentation to enhance training could be considered to evaluate the model.

CONCLUSION

By analyzing the model prediction accuracies and learning curves, we demonstrate that a single universal model for NIBG prediction could suffer from uncontrollable factors such as the medical treatment. By separating the subjects into cohorts, the model of FIG. 3C with subjects without medical treatment of any sort has approximately 30% higher prediction accuracy to its counterpart. Furthermore, adding HbA1c makes this model achieved RMSE of 12.4 mg/dl, MAE of 8.9 mg/dl, MAPE of 0.08, and 94.3% prediction accuracy, and no failed predictions fallen into erroneous zones C, D, and E of CEG plot. Similar trends are also seen in models of FIGS. 3B and 3D. We believe that the proposed model with cohort data arrangement and quarterly measured HbA1c is very promising for clinical usage for the population without any medical treatment.

Nevertheless, we also found medical treatment have significant impacts on NIBG estimation by altering one's exhibited physiological signal and resulting in deviated predictions. With the input of HbA1c, we have done our best to boost the prediction accuracy of cohort undergoing medical treatment of around 20% improvement in zoon A of CEG plot. For further improvement, we recommend the approach of personalized models to nullify diversities between individuals to acquire clinically acceptable performance. We believe it would be a more preferable solution to extend NIBG with machine learning to all populations.

Although the present invention has been described in terms of specific exemplary embodiments and examples, it can be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

REFERENCES (EACH INCORPORATED IN ITS ENTIRETY)

1. Sarkar, K., et al. *Design and Implementation of a Noninvasive Blood Glucose Monitoring Device.* in 2018 21st International Conference of Computer and Information Technology (ICCIT). 2018. Dhaka, Bangladesh: IEEE.
2. Mekonnen, B. K., et al., *Accurate prediction of glucose concentration and identification of major contributing features from hardly distinguishable near-infrared spectroscopy.* Biomedical Signal Processing and Control, 2020. 59: p. 101923.
3. Maier, J. S., et al., *Possible correlation between blood glucose concentration and the reduced scattering coefficient of tissues in the near infrared.* Optics letters, 1994. 19(24): p. 2062-2064.
4. Tamada, J. A., et al., *Noninvasive glucose monitoring: comprehensive clinical results. Cygnus Research Team.* Jama, 1999. 282(19): p. 1839-44.
5. Klonoff, D. C., *Noninvasive blood glucose monitoring.* Diabetes care, 1997. 20(3): p. 433-437.

6. Larin, K. V., et al., *Noninvasive blood glucose monitoring with optical coherence tomography: a pilot study in human subjects.* Diabetes care, 2002. 25(12): p. 2263-2267.
7. Yadav, J., et al., *Prospects and limitations of non-invasive blood glucose monitoring using near-infrared spectroscopy.* Biomedical signal processing and control, 2015. 18: p. 214-227.
8. Abd Salam, N. A. B., et al., *The evolution of non-invasive blood glucose monitoring system for personal application.* Journal of Telecommunication, Electronic and Computer Engineering (JTEC), 2016. 8(1): p. 59-65.
9. Monte-Moreno, E., *Non-invasive estimate of blood glucose and blood pressure from a photoplethysmograph by means of machine learning techniques.* Artificial Intelligence in Medicine, 2011. 53(2): p. 127-138.
10. Blank, T. B., et al. *Clinical results from a noninvasive blood glucose monitor. in Optical Diagnostics and Sensing of Biological Fluids and Glucose and Cholesterol Monitoring II.* 2002. International Society for Optics and Photonics.
11. Paul, B., M. P. Manuel, and Z. C. Alex. *Design and development of non invasive glucose measurement system.* in 2012 1st International Symposium on Physics and Technology of Sensors (ISPTS-1). 2012.
12. Ramasahayam, S., et al. *FPGA based system for blood glucose sensing using photoplethysmography and online motion artifact correction using adaline.* in 2015 9th International Conference on Sensing Technology (ICST). 2015.
13. Rachim, V. P. and W.-Y. Chung, *Wearable-band type visible-near infrared optical biosensor for non-invasive blood glucose monitoring.* Sensors and Actuators B: Chemical, 2019. 286: p. 173-180.
14. Maruo, K., et al., *New methodology to obtain a calibration model for noninvasive near-infrared blood glucose monitoring.* Applied spectroscopy, 2006. 60(4): p. 441-449.
15. Alian, A. A. and K. H. Shelley, *Photoplethysmography.* Best Pract Res Clin Anaesthesiol, 2014. 28(4): p. 395-406.
16. Jain, P., A. M. Joshi, and S. P. Mohanty, iGLU 1.0: *An Accurate Non-Invasive Near-Infrared Dual Short Wavelengths Spectroscopy based Glucometer for Smart Healthcare.* arXiv preprint arXiv: 1911.04471, 2019.
17. Bunescu, R., et al. *Blood glucose level prediction using physiological models and support vector regression.* in 2013 12th International Conference on Machine Learning and Applications. 2013. IEEE.
18. Georga, E. I., et al. *A predictive model of subcutaneous glucose concentration in type 1 diabetes based on random forests.* in 2012 Annual International Conference of the IEEE Engineering in Medicine and Biology Society. 2012. IEEE.
19. Altman, N. S., *An Introduction to Kernel and Nearest-Neighbor Nonparametric Regression.* The American Statistician, 1992. 46(3): p. 175-185.
20. Tomczak, J. M. *Gaussian Process Regression with Categorical Inputs for Predicting the Blood Glucose Level.* in Advances in Systems Science. 2017. Cham: Springer International Publishing.
21. Yadav, J., et al., *Investigations on multisensor-based noninvasive blood glucose measurement system.* Journal of Medical Devices, 2017. 11(3).
22. Paneni, F., et al., *Diabetes and vascular disease: pathophysiology, clinical consequences, and medical therapy: part I.* Eur Heart J, 2013. 34(31): p. 2436-43.
23. Benichou, T., et al., *Heart rate variability in type 2 diabetes mellitus: A systematic review and meta-analysis.* PLOS One, 2018. 13(4): p. e0195166.
24. *Use of Glycated Haemoglobin (HbA1c) in the Diagnosis of Diabetes Mellitus: Abbreviated Report of a WHO Consultation, in WHO Guidelines Approved by the Guidelines Review Committee.* 2011, World Health Organization: Geneva.
25. Chu, J., et al., *One-Minute Finger Pulsation Measurement for Diabetes Rapid Screening with 1.3% to 13% False-Negative Prediction Rate.* Biomedical Statistics and Informatics, 2021. 6: p. 8.
26. Navakatikyan, M. A., et al., *A real-time algorithm for the quantification of blood pressure waveforms.* IEEE Trans Biomed Eng, 2002. 49(7): p. 662-70.
27. Szegedy, C., et al., *Going deeper with convolutions,* in 2015 IEEE Conference on Computer Vision and Pattern Recognition (CVPR). 2015. p. 1-9.
28. Kiranyaz, S., et al., *1D convolutional neural networks and applications: A survey.* Mechanical Systems and Signal Processing, 2021. 151.
29. Clarke, W. L., et al., *Evaluating clinical accuracy of systems for self-monitoring of blood glucose.* 1987. 10(5): p. 622-628.

What is claimed is:

1. A photoplethysmography (PPG) based non-invasive blood glucose (NIBG) prediction system comprising
   a signal reader configured to read one or more PPG signals from a subject; and
   a processor which, in turn, comprises a neural network (NN) configured to predict a subject's blood glucose level;
   wherein the processor is configured to perform signal processing on the one or more PPG signals read by the signal reader;
   wherein the processor is configured to predict a subject's blood glucose level using the NN;
   wherein the input to the NN comprises the signal processing results by the processor of the one or more PPG signals and HbA1c obtained from the subject;
   wherein the NN is trained using training data obtained from training cohort not undergoing any medical treatment; and
   wherein the subject is not undergoing any medical treatment.

2. The system of claim 1, wherein the input to the NN further comprises personal physiological features, pulse morphological features, heart rate variance features or a combination thereof wherein the pulse morphological features and heart rate variance features are derived from the one or more PPG signals or derived from the processing results of the one or more PPG signals.

3. The system of claim 2, wherein the personal physiological features comprise age, waist circumference, body mass index, systolic blood pressure, diastolic blood pressure or a combination thereof.

4. The system of claim 2, wherein the pulse morphological features comprise the width of the pulse at 50% height, total pulse area of the minute, average pulse area, the median of the pulse area, time difference from pulse valley to peak or a combination thereof.

5. The system of claim 2, wherein the heart rate variance features comprise low-frequency power from fast Fourier transformation (FFT), high-frequency power from FFT, total power from FFT, percentage of pulse successive interval changes exceeding 20 ms, the standard deviation of successive interval changes or a combination thereof.

6. The system of claim 1, wherein the NN comprises a convolution neural network (CNN).

7. The system of claim 6, wherein the CNN comprises one or more convolution layers wherein each convolution layer is configured to perform convolution operation on the one or more inputs or output from another convolution layer.

8. The system of claim 7 wherein the CNN comprises two or more CNN modules in parallel.

9. The system of claim 8 wherein each CNN module comprises filters of different lengths compared to each of the filters of other CNN modules.

10. The system of claim 9, wherein the CNN comprises two CNN modules and wherein filter length for one CNN module is ¼ to ¾ the length of the filter length of the other CNN module.

11. The system of claim 8, wherein the CNN further comprises a merging block configured to merge and analyze output of each of the CNN modules.

12. The system of claim 1, wherein the processor creates a signal window as input to the NN by digitizing a segment of the PPG signal.

13. The system of claim 12, wherein the signal window duration comprises two full pulses of the PPG signal.

14. A method for PPG based non-invasive blood glucose (NIBG) prediction comprising the steps of reading one or more PPG signals from a subject;
obtaining HbA1c from the subject using conventional finger prick method;
processing the one or more PPG signals using a processor;
training a neural network (NN); and
predicting blood glucose level of the subject using the trained NN
wherein input to the NN comprises the HbA1c and the processing results of the one or more PPG signals;
wherein the training step is performed based on HbA1c and PPG signal data obtained from training cohort not undergoing any medical treatments; and
wherein the subject is not undergoing any medical treatments.

15. The method of claim 14 wherein input to the NN further comprises personal physiological features, pulse morphological features, heart rate variance features or a combination thereof.

16. The method of claim 15, wherein the personal physiological features comprises age, waist circumference, body mass index, systolic blood pressure, diastolic blood pressure or a combination thereof.

17. The method of claim 15, wherein the pulse morphological features comprise the width of the pulse at 50% height, total pulse area of the minute, average pulse area, the median of the pulse area, time difference from pulse valley to peak or a combination thereof.

18. The method of claim 15, wherein the heart rate variance features comprise low-frequency power from fast Fourier transformation (FFT), high-frequency power from FFT, total power from FFT, percentage of pulse successive interval changes exceeding 20 ms, the standard deviation of successive interval changes or a combination thereof.

19. The method of claim 14 wherein the step of processing the one or more PPG signals comprises the step of extracting pulse morphological features and heart rate variance features from the one or more PPG signals.

20. The method of claim 14, wherein the NN comprises a convolution neural network (CNN).

21. The method of claim 20 wherein the CNN comprises one or more convolution layers wherein each convolution layer is configured to perform convolution operation on the one or more inputs or output from another convolution layer.

22. The method of claim 20 wherein the CNN comprises two or more CNN modules in parallel.

23. The method of claim 22 wherein each CNN module comprises filters of different lengths compared to each of the filters of the other CNN modules.

24. The method of claim 22, wherein the CNN comprises two CNN modules and wherein filter length for one CNN module is ¼ to ¾ the length of the filter length of the other CNN module.

25. The method of claim 22, wherein the CNN further comprises a merging block configured to merge and analyze output of each CNN module.

26. The method of claim 14, wherein the processing step comprises creating a signal window as input to the NN by digitizing a segment of one of the one or more PPG signal.

27. The method of claim 26, wherein the signal window duration comprises two full pulses of the PPG signal.

* * * * *